May 19, 1964     E. FREUDMAN     3,133,658
FREIGHT CONTAINERS

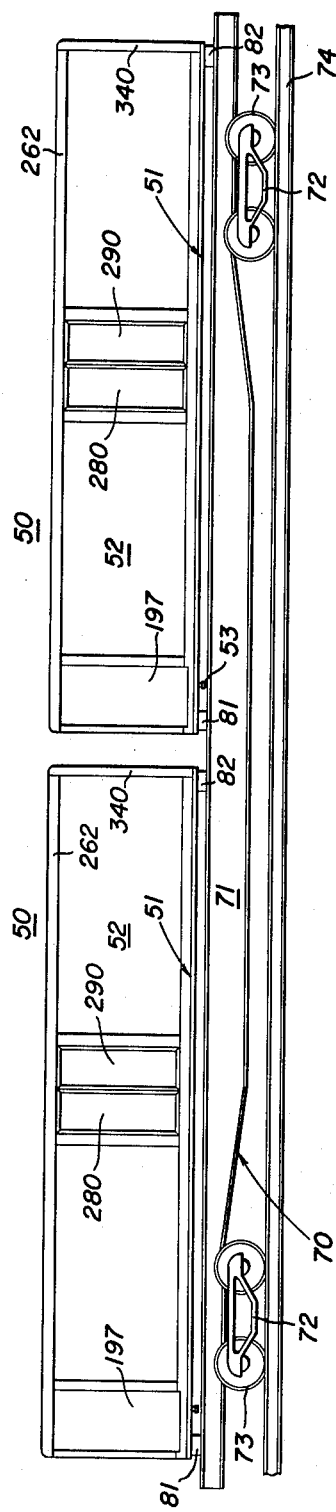
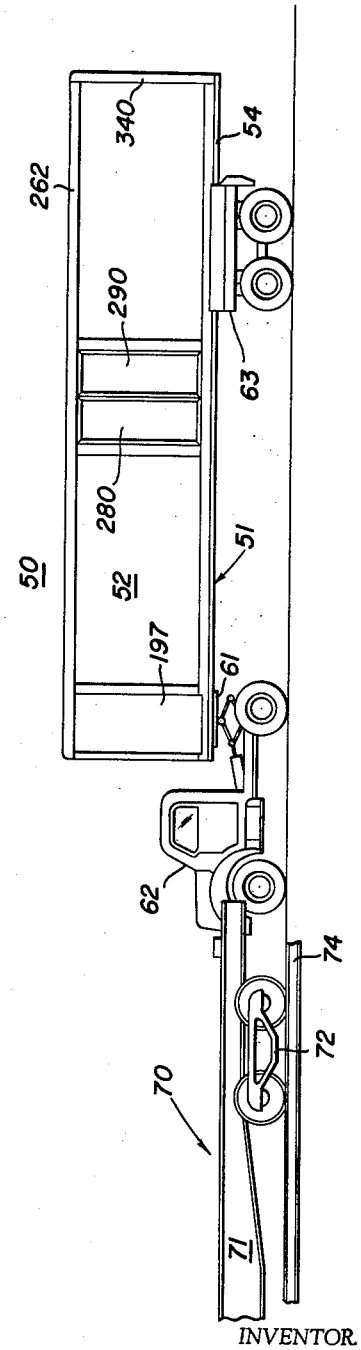

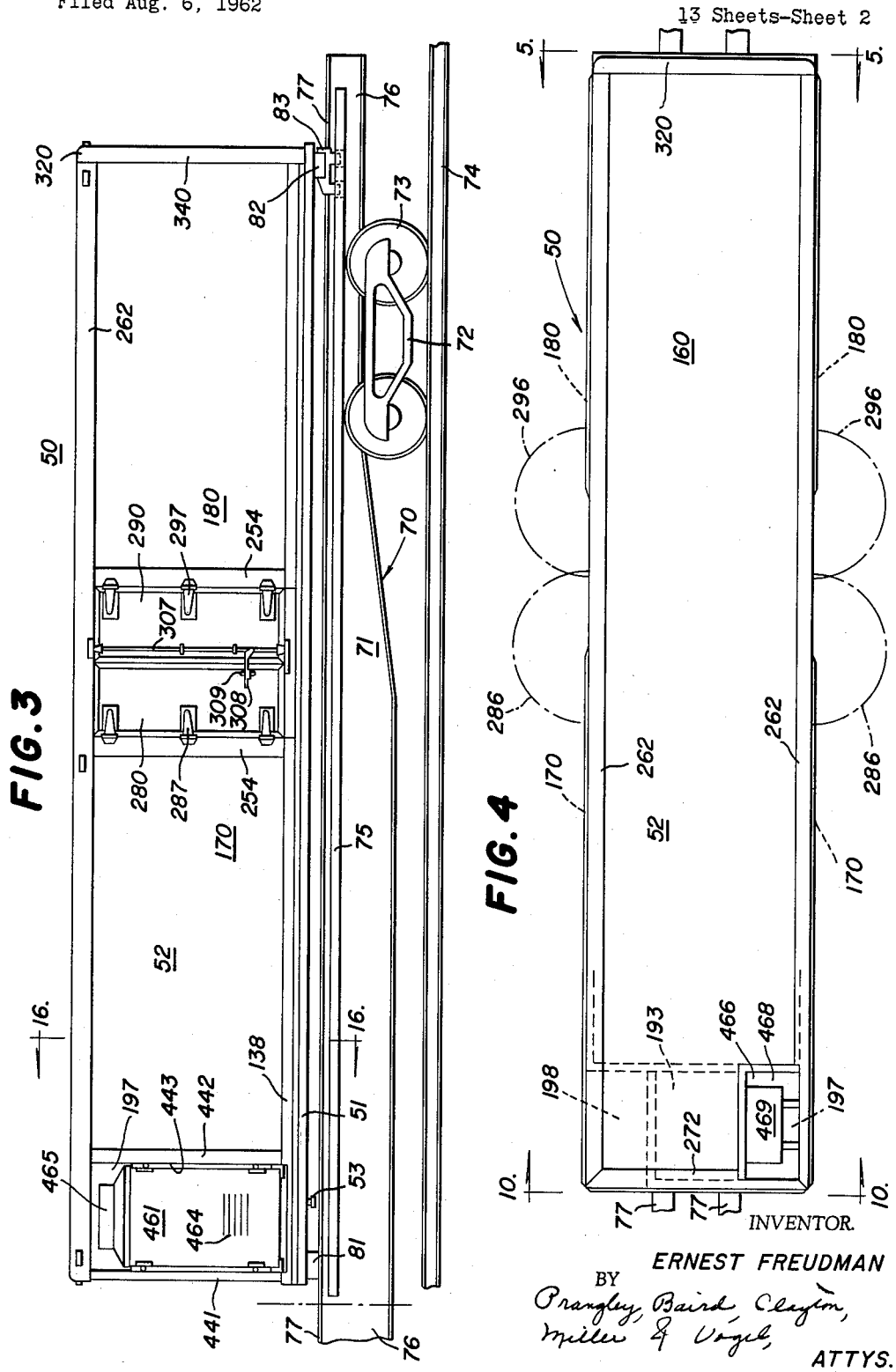

Filed Aug. 6, 1962     13 Sheets-Sheet 3

INVENTOR.
ERNEST FREUDMAN
BY
ATTYS.

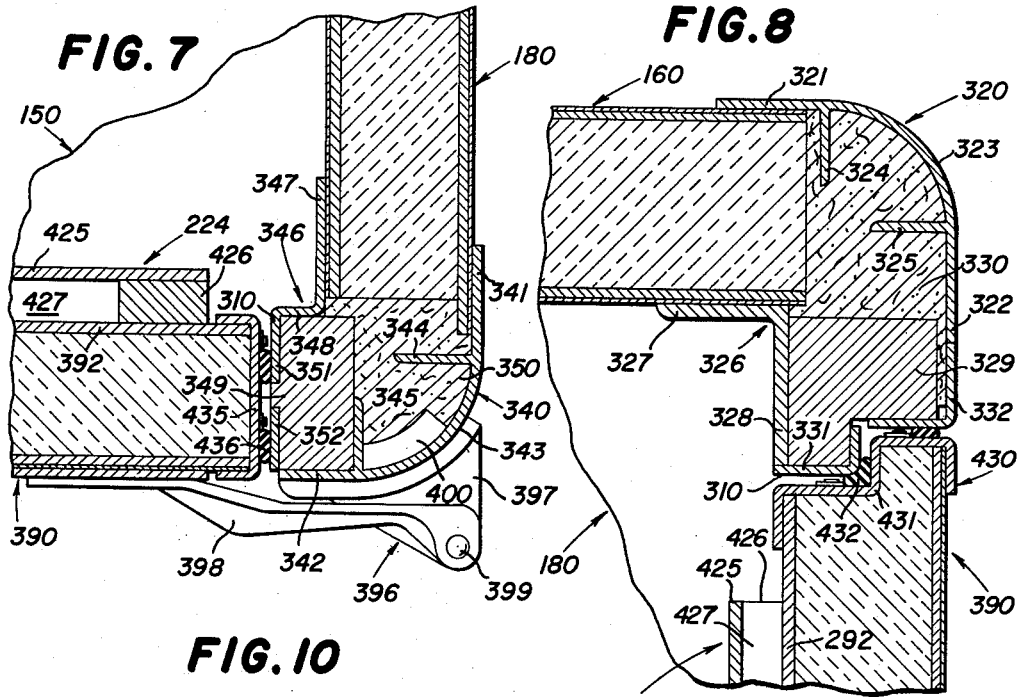
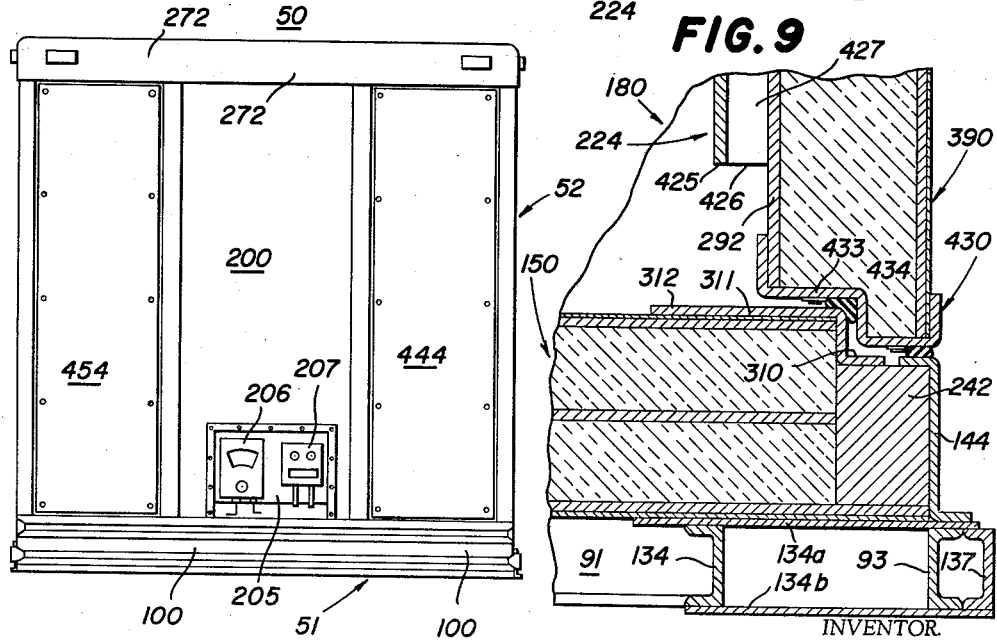

May 19, 1964
E. FREUDMAN
3,133,658
FREIGHT CONTAINERS
Filed Aug. 6, 1962
13 Sheets-Sheet 5
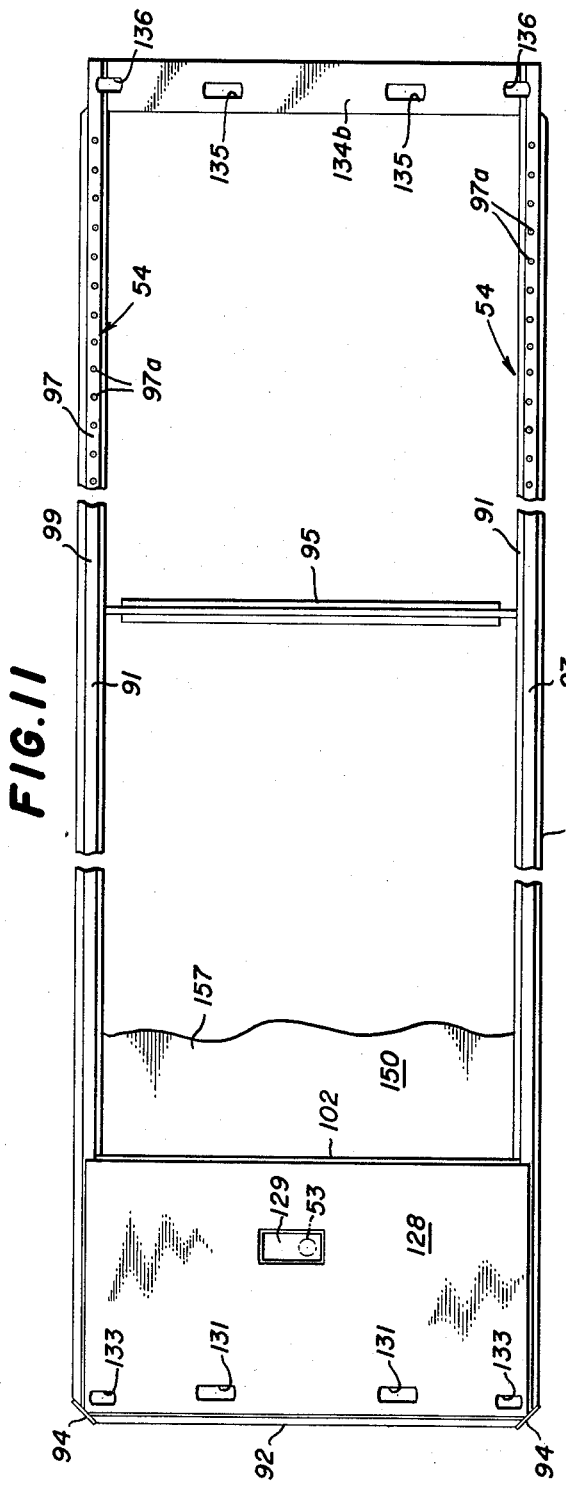
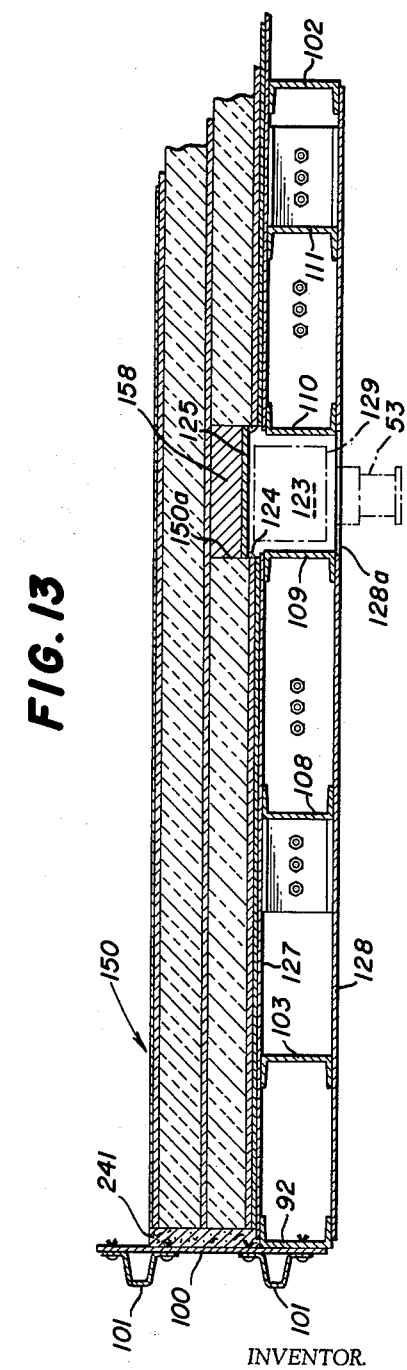
INVENTOR.
ERNEST FREUDMAN
BY
Prangley, Baird, Clayton,
Miller & Vogel,
ATTYS.

May 19, 1964 E. FREUDMAN 3,133,658
FREIGHT CONTAINERS
Filed Aug. 6, 1962 13 Sheets-Sheet 6

INVENTOR.
ERNEST FREUDMAN
BY Prangley, Baird, Clayton,
Miller & Vogel,
ATTYS.

May 19, 1964  E. FREUDMAN  3,133,658
FREIGHT CONTAINERS
Filed Aug. 6, 1962  13 Sheets-Sheet 7
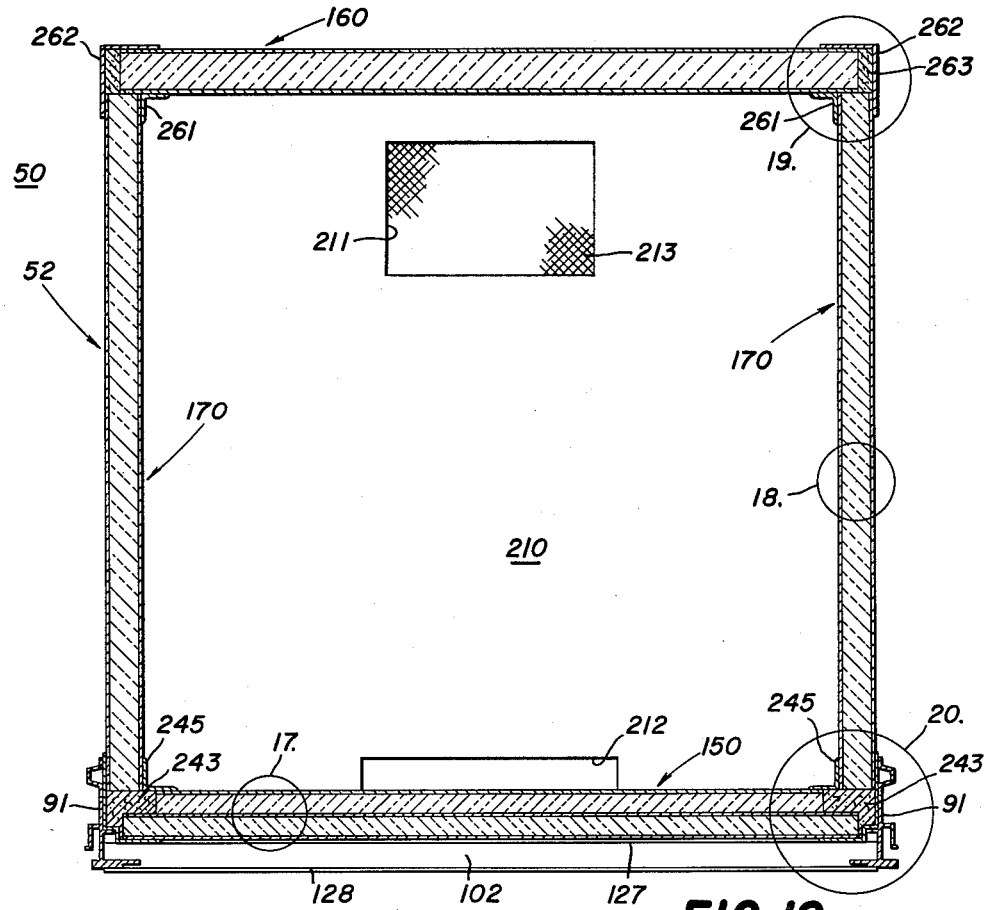
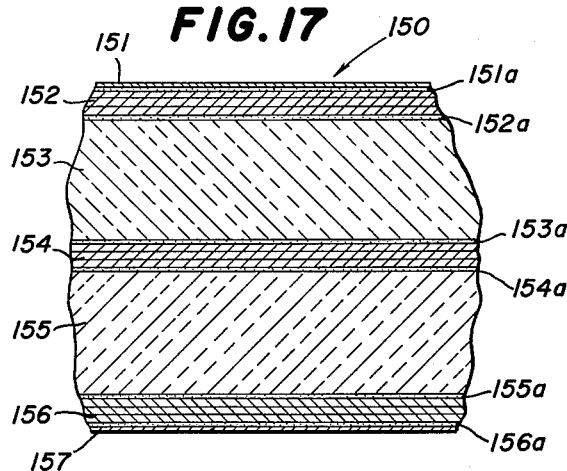
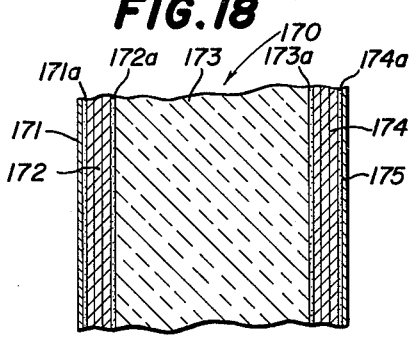
INVENTOR.
ERNEST FREUDMAN
BY
Prangley, Baird, Clayton,
Miller & Vogel,
ATTYS.

May 19, 1964     E. FREUDMAN     3,133,658
FREIGHT CONTAINERS
Filed Aug. 6, 1962     13 Sheets-Sheet 8

INVENTOR.
ERNEST FREUDMAN
BY
Prangley, Baird, Clayton
Miller & Vogel,
ATTYS.

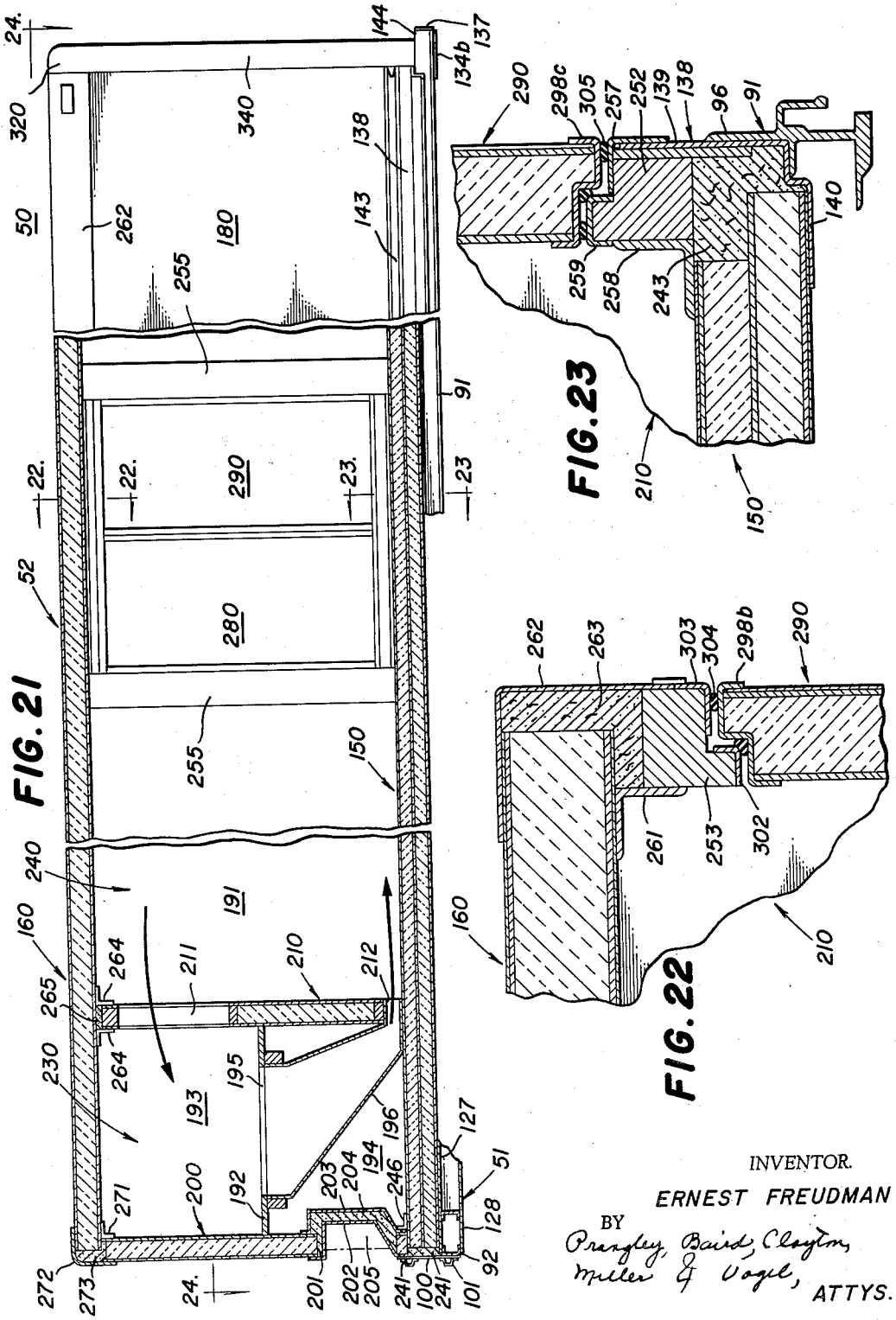

May 19, 1964     E. FREUDMAN     3,133,658
FREIGHT CONTAINERS
Filed Aug. 6, 1962     13 Sheets-Sheet 10
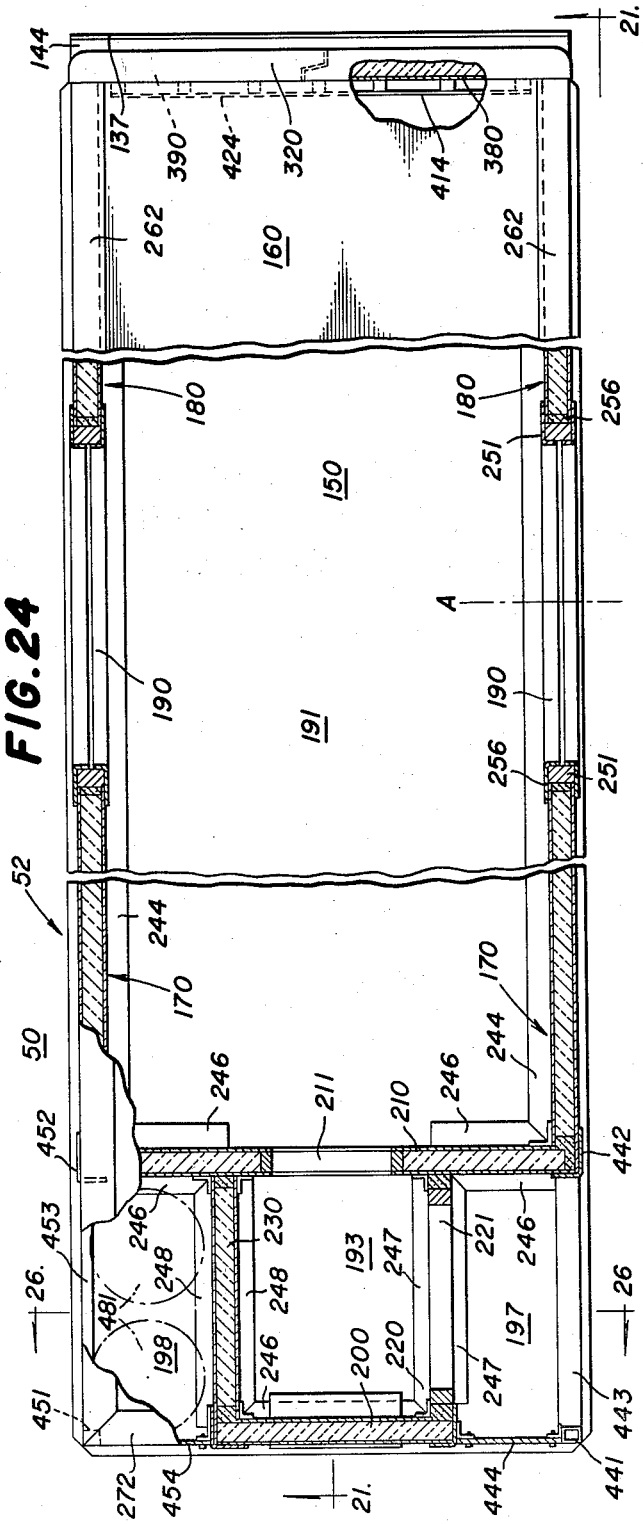
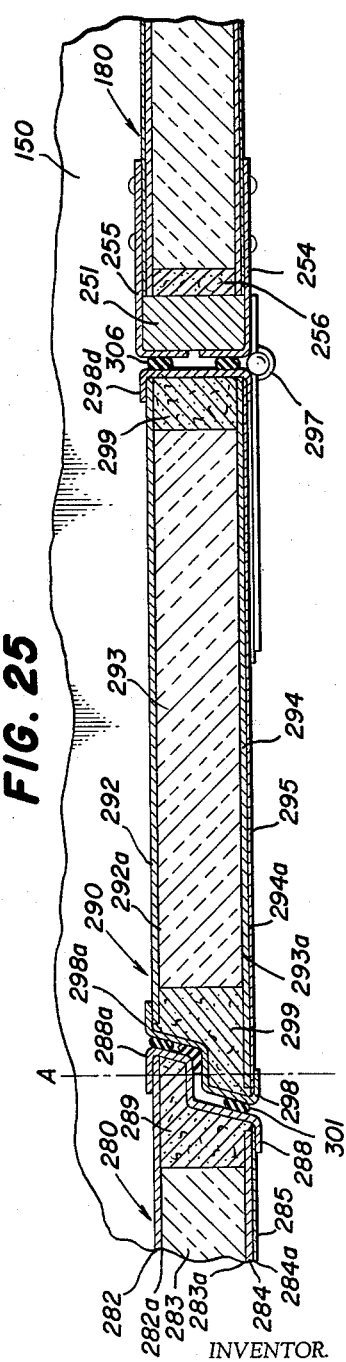
INVENTOR.
ERNEST FREUDMAN
BY Pranley, Baird, Clayton, Miller & Vogel,
ATTYS.

May 19, 1964 E. FREUDMAN 3,133,658
FREIGHT CONTAINERS
Filed Aug. 6, 1962 13 Sheets-Sheet 11
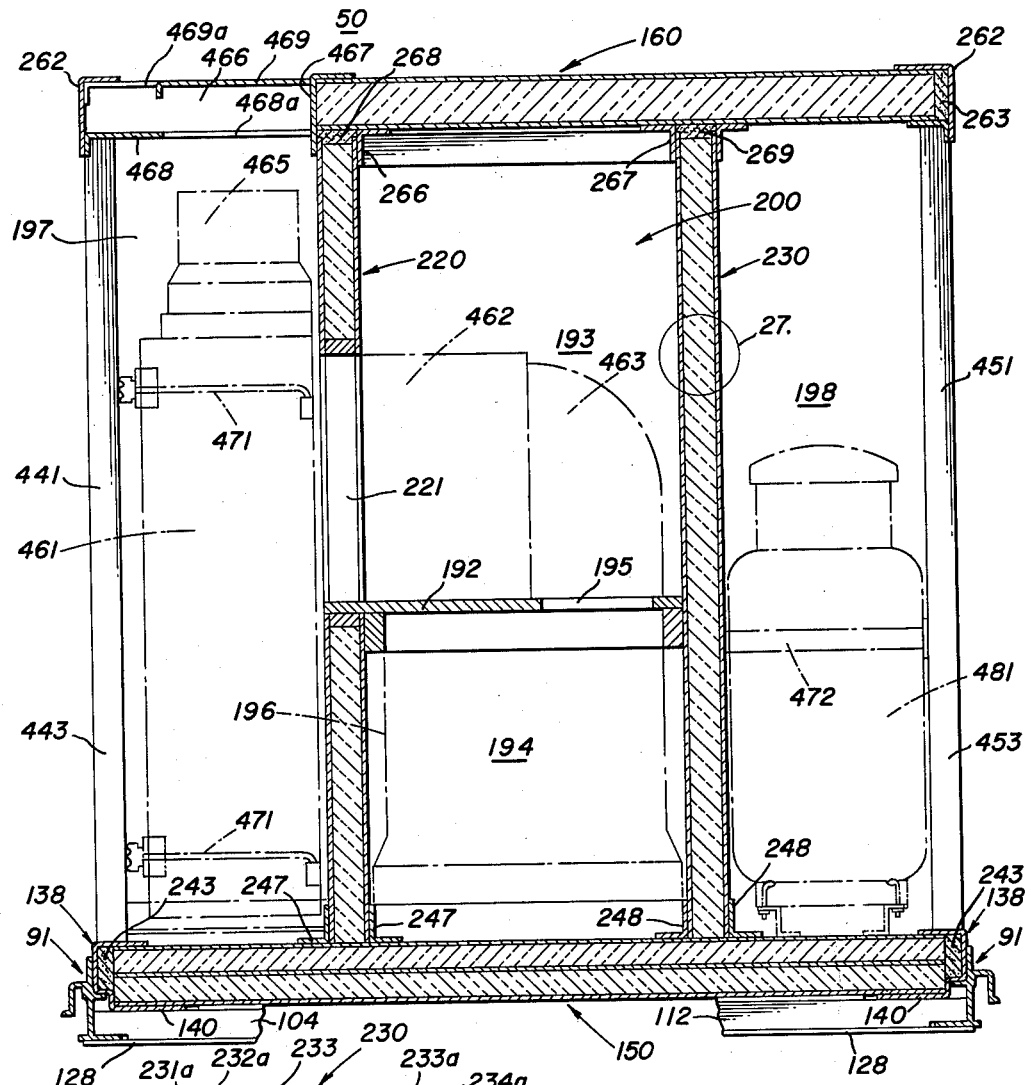
INVENTOR.
ERNEST FREUDMAN
BY
Prangley, Baird, Clayton,
Miller & Vogel,
ATTYS.

May 19, 1964  E. FREUDMAN  3,133,658
FREIGHT CONTAINERS
Filed Aug. 6, 1962  13 Sheets-Sheet 12

INVENTOR.
ERNEST FREUDMAN
BY
ATTYS.

May 19, 1964  E. FREUDMAN  3,133,658
FREIGHT CONTAINERS
Filed Aug. 6, 1962  13 Sheets-Sheet 13
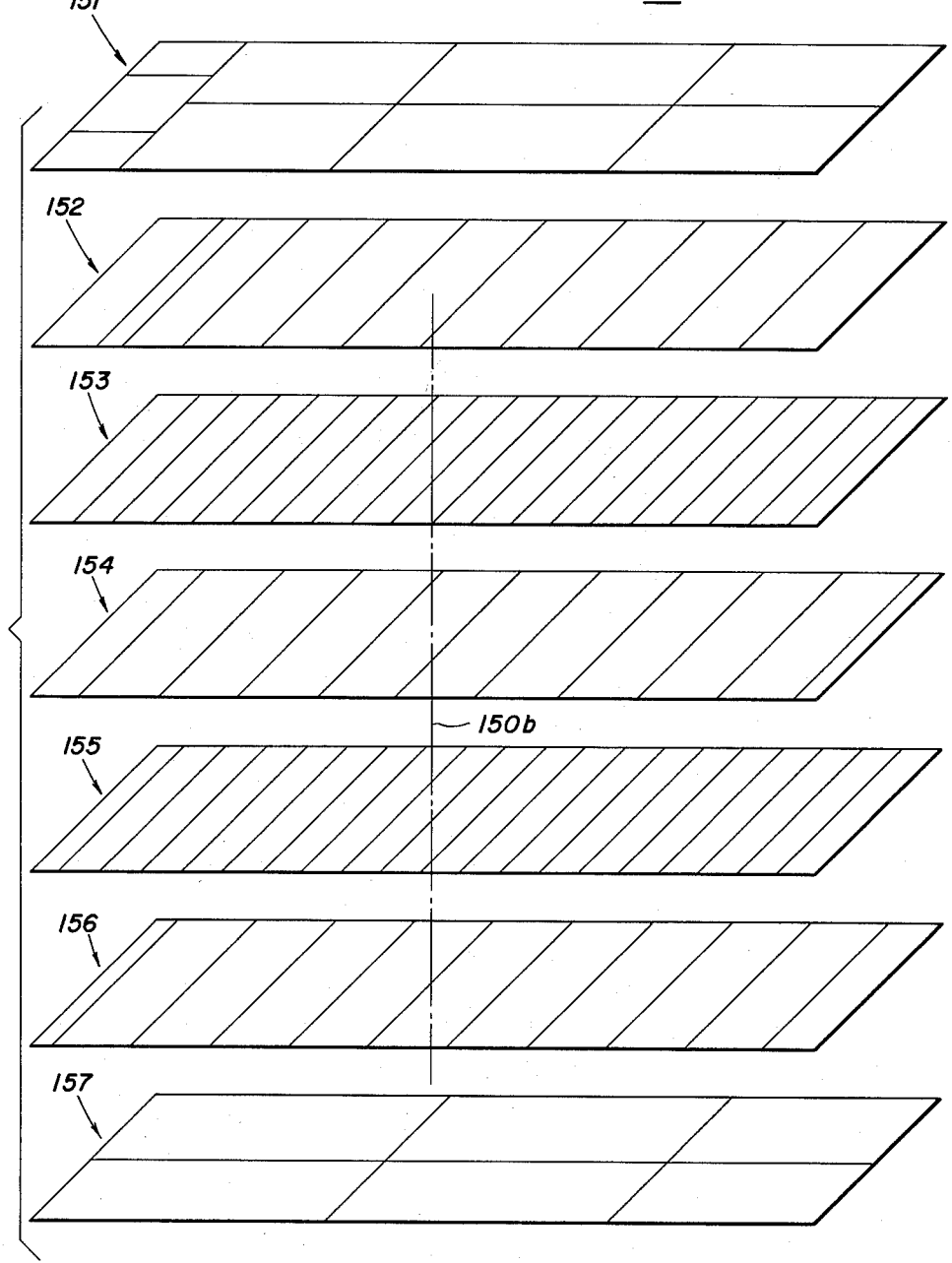

United States Patent Office 3,133,658
Patented May 19, 1964

3,133,658
FREIGHT CONTAINERS
Ernest Freudman, Maywood, Ill., assignor to General American Transportation Corporation, Chicago, Ill., a corporation of New York
Filed Aug. 6, 1962, Ser. No. 215,095
20 Claims. (Cl. 220—1.5)

The present invention relates to freight containers, and more particularly to such containers of the heat-insulated and refrigerated type that may be readily converted into the body of a road semi-trailer for highway operation and into the body of a railway car for railway operation.

It is a general object of the invention to provide a freight container of the character noted that carries improved structure accommodating the ready connection thereto of highway running gear for use thereof in highway operation and that carries improved structure accommodating the ready connection thereto of railway running gear for use thereof in railway operation.

Another object of the invention is to provide a freight container comprising an improved composite base that consists essentially of an elongated substantially rectangular boundary frame and an elongated substantially rectangular floor panel arranged within the boundary frame and securely fastened thereto, wherein the floor panel is of prefabricated unitary rigid sandwich structure, whereby it is the floor panel that lends great strength and rigidity to the composite base and thus to the container.

A further object of the invention is to provide a freight container comprising a floor panel of prefabricated unitary rigid sandwich structure involving an improved arrangement and disposition of the individual plies thereof.

A further object of the invention is to provide a freight container comprising a prefabricated unitary rigid floor panel of improved seven-ply structure.

A further object of the invention is to provide a freight container comprising an improved floor panel of the character noted, wherein the floor panel essentially comprises an outer weather sheet of metal, a first sheet of plywood intimately adhered to the inner surface of the weather sheet, a first slab of synthetic organic resin of rigid cellular structure intimately adhered to the inner surface of the first plywood sheet, a second sheet of plywood intimately adhered to the inner surface of the first slab, a second slab of synthetic organic resin of rigid cellular structure intimately adhered to the inner surface of the second plywood sheet, a third sheet of plywood intimately adhered to the inner surface of the second slab, and an inner liner sheet of metal intimately adhered to the inner surface of the third plywood sheet.

A further object of the invention is to provide a freight container comprising an improved floor panel of the character described that is of block-like configuration having a length in excess of about 30 feet and a width in excess of about 6 feet and a thickness in excess of about 4 inches.

A further object of the invention is to provide a freight container comprising an improved floor panel of the character described, wherein each of the outer weather sheet and the inner liner sheet is formed of a metal selected from the class consisting of steel and stainless steel and aluminum and having a thickness of the order of 20 to 50 mils, each of the plywood sheets is formed of fir and having a thickness of about ¼ inch, and each of the slabs is formed of foamed polystyrene and having a thickness of about 2 inches.

A further object of the invention is to provide in a freight container, a composite base comprising an elongated substantially rectangular boundary frame and an elongated substantially rectangular floor panel of prefabricated unitary rigid sandwich structure arranged in the boundary frame and securely fastened in place therein, wherein the boundary frame includes a pair of longitudinally extending side sills and a pair of laterally extending end sills with the adjacent ends of the sills rigidly secured together, wherein each of the side sills comprises a metal extrusion of improved construction and arrangement, so as to facilitate the assembly of the elements of the composite base and to insure a strong rigid construction thereof.

A further object of the invention is to provide a refrigerated container having a body of strong rigid construction and essentially comprising an elongated substantially rectangular floor panel, an elongated substantially rectangular roof panel, and an upstanding substantially rectangular bulkhead panel arranged between the floor panel and the roof panel and securely fastened thereto, the bulkhead panel extending laterally across the container and being disposed rearwardly of the front ends of the floor panel and the roof panel, wherein each of the panels named is of prefabricated unitary rigid heat-insulating sandwich structure.

A further object of the invention is to provide a refrigerated container having a body of strong rigid construction, as previously described, and further comprising first upstanding heat-insulating wall structure arranged between the floor panel and the roof panel and located rearwardly of the bulkhead panel and cooperating mutually therewith to define a lading compartment in the body disposed in the central portion and in the rear end of the container, and second upstanding heat-insulating wall structure arranged between the floor panel and the roof panel and located forwardly of the bulkhead panel and cooperating mutually therewith to define a plenum chamber in the body disposed in the front end of the container, and wherein holes are formed in the bulkhead panel to accommodate the circulation of air between the lading compartment and the plenum chamber.

Yet another object of the invention is to provide a refrigerated container of the character described, that further comprises other wall structure cooperating mutually with the floor panel and the roof panel and the second wall structure mentioned to define a machinery compartment therein disposed in one corner in the front end of the container, and further wall structure cooperating mutually with the floor panel and the roof panel and the second wall structure mentioned to define a fuel tank storage compartment therein disposed in the other corner in the front end of the container, and wherein the plenum chamber is arranged in the central portion of the front end of the container and intermediate the machinery compartment and the fuel tank storage compartment.

A still further object of the invention is to provide a refrigerated container of the character described, wherein the machinery compartment is adapted to receive a removable unit comprising an internal combustion engine and a refrigerating machine including a compressor driven by the internal combustion engine, a condenser connected to the compressor, and an evaporator connected between the condenser and the compressor, wherein the second wall structure mentioned has an opening therein adapted to accommodate the passage therethrough of the evaporator, and whereby the evaporator is disposed in the plenum chamber when the unit occupies its normal position in the machinery compartment.

A still further object of the invention is to provide a refrigerated container of the character described, wherein the roof panel has a flue formed therethough for the passage to the exterior from the machinery compartment of exhaust combustion gases from the internal combustion engine and of cooling air that is circulated over the condenser.

Further features of the invention pertain to the particular arrangement of the elements of the freight container, whereby the above-outlined and additional operating features thereof are attained.

The invention, both as to its organization and method of operation, together with further objects and advantages thereof, will best be understood by reference to the following specification, taken in connection with the accompanying drawings, in which:

FIGURE 1 is a side elevational view of a freight container embodying the present invention and illustrating the combination of the container with highway running gear to produce a road semi-trailer;

FIG. 2 is a side elevational view of two of the freight containers and illustrating the combination of the two containers with railway running gear to produce a composite body for a railway car;

FIG. 3 is a side elevational view of the freight container in its mounted position upon the right-hand end of the railway car, as shown in FIG. 2;

FIG. 4 is a plan view of the freight container, as shown in FIG. 3;

FIG. 7 is a greatly enlarged horizontal sectional view taken through one side of the rear end of the freight container, this view being taken in the direction of the arrows along the line 7—7 in FIG. 5;

FIG. 8 is a greatly enlarged vertical sectional view taken through the top of the rear end of the freight container, this view being taken in the direction of the arrows along the line 8—8 in FIG. 5;

FIG. 9 is a greatly enlarged vertical sectional view taken through the bottom of the rear end of the freight container, this view being taken in the direction of the arrows along the line 9—9 in FIG. 5;

FIG. 10 is an enlarged front end elevational view of the freight container, this view being taken in the direction of the arrows along the line 10—10 in FIG. 4;

FIG. 11 is an enlarged fragmentary bottom view of the freight container, as shown in FIG. 3;

FIG. 13 is an enlarged fragmentary vertical sectional view of the front end portion of the freight container, this view being taken in the direction of the arrows along the line 13—13 in FIG. 12;

FIG. 16 is an enlarged vertical sectional view of the freight container, this view being taken in the direction of the arrows along the line 16—16 in FIG. 3;

FIG. 17 is a greatly enlarged view of a detail of construction of the floor panel incorporated in the freight container, as shown in the circle designated 17 in FIG. 16;

FIG. 18 is a greatly enlarged view of a detail of construction of the side wall panel incorporated in the freight container, as shown in the circle designated 18 in FIG. 16;

FIG. 21 is an enlarged fragmentary side elevational view, partly in vertical section, of the freight container, this view being taken in the direction of the arrows along the offset line 21—21 in FIG. 24;

FIG. 22 is an enlarged fragmentary vertical sectional view taken through the top and side of the freight container at one of the side doors incorporated therein, this view being taken in the direction of the arrows along the line 22—22 in FIG. 21;

FIG. 23 is an enlarged fragmentary vertical sectional view taken through the bottom and side of the freight container at one of the side doors incorporated therein, this view being taken in the direction of the arrows along the line 23—23 in FIG. 21;

FIG. 24 is an enlarged fragmentary plan view, partly in horizontal section, of the freight container, this view being taken in the direction of the arrows along the offset line 24—24 in FIG. 21;

FIG. 25 is an enlarged fragmentary horizontal sectional view, similar to a portion of FIG. 24, and illustrating the arrangement of the side doors in the side wall of the freight container;

FIG. 26 is an enlarged vertical sectional view taken through the front end of the freight container, this view being taken in the direction of the arrows along the line 26—26 in FIG. 24;

FIG. 27 is a greatly enlarged view of a detail of construction of a dividing wall incorporated in the front end of the freight container, as shown in the circle designated 27 in FIG. 26;

FIG. 31 is a diagrammatic exploded perspective view of the several elements incorporated in the floor panel, as shown in FIGS. 28, 29 and 30, and illustrating the arrangement of the joints between the several members of each of the several elements as being in non-overlapping relation with respect to each other.

Figure 5:
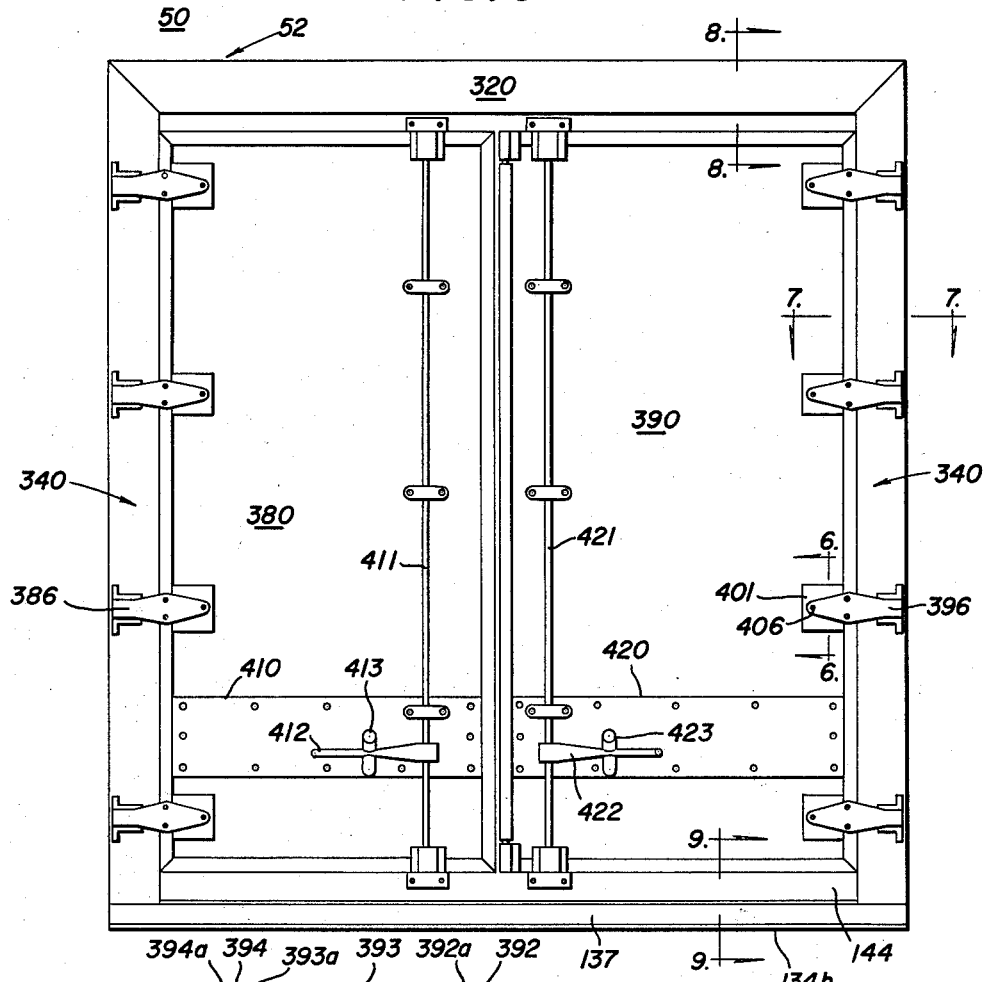
FIG. 5 is an enlarged rear end elevational view of the freight container, this view being taken in the direction of the arrows along the line 5—5 in FIG. 4.

Referring now to FIGS. 1 and 2 of the drawings, the several identical freight containers 50 there illustrated, and embodying the features of the present invention, are adapted to be employed in freight transportation systems of the highway-railway-waterway type. Specifically, the container 50 may be combined with highway running gear to produce a road semi-trailer, as shown in FIG. 1; two of the containers 50 may be combined with railway running gear to produce a composite body for a railway car, as shown in FIG. 2; and a great plurality of the containers 50 may be suitably stored in the hold of a ship, not shown, to compartmentize the same in an obvious manner. Specifically, the container 50 comprises a rigid base 51 carrying on the top thereof a substantially box-like body 52. Also, the bottom front central bottom portion of the base 51 carries a downwardly directed kingpin 53 and the bottom rear side portions of the base 51 respectively carry longitudinally extending downwardly directed rail-like structure 54.

When the container 50 is adapted for highway transportation, as shown in FIG. 1, the kingpin 53 thereof is coupled to a conventional fifth-wheel mechanism 61 carried by the rear end of a conventional road tractor 62, the fifth wheel mechanism 61 being of the elevator type selectively movable between a lower road-traveling position and an upper transfer position in the usual manner. Also, the fifth-wheel mechanism 61 is selectively operable to couple and to uncouple the kingpin 53 in the usual manner. Moreover, the structures 54 are connected to a conventional road bogie 63 of the usual road-wheel type. Thus, the container 50 and the road bogie 63 cooperate to produce a road semi-trailer.

When the containers 50 are adapted for railway transportation, as shown in FIG. 2, the respective bases 51 of two of the containers 50 are mounted upon the opposite top ends of the frame 71 of a cooperating railway car 70. Preferably, the railway car 70 is of the construction and arrangement of that disclosed in the copending application of Deodat Clejan, Serial No. 151,358, filed November 9, 1961, now Patent No. 3,102,646; which railway car 70 is of skeleton-like construction in that the frame 71 thereof consists essentially of an elongated beam or center sill arranged in bridging relation with a pair of longitudinally spaced-apart trucks 72 provided with flanged track wheels 73 engaging the rails of an associated railway track indicated at 74. Also, as best shown in FIG. 3, the opposite outer sides of the beam or center sill 71 respectively carry elongated longitudinally extending members 75, two of such members 75 being independently resiliently mounted upon each side of the center sill 71 and disposed in longitudinal alignment with each other. Also, the center sill 71 essentially comprises two longitudinally extending and laterally spaced-apart I-beams 76 and is of fish-belly construction. Thus, the top flanges 77 of the I-beams 76 constitute the respective rails of a narrow gauge track provided upon the top side edges of the center sill 71 and disposed, together with the members 75, well inwardly with respect to the inner sides of the track wheels 73 carried by the trucks 72. The members 75 are disposed below the adjacent top flange 77 of the associated I-beam 76, as illustrated in FIG. 3, and also project laterally outwardly somewhat beyond the adjacent top flange 77, so that the members 75 are readily accessible from the top sides of the center sill 71 for securing purpose, and further the members 71 perform a shock-absorbing purpose; all as explained more fully below.

Preferably, each of the containers 50 is mounted upon the top of the railway car 70 employing a laterally extending front bolster 81 and a laterally extending rear bolster 82 of the construction and arrangement of that disclosed in the copending application of Robert L. Hassenauer and Samuel H. Enochian, Serial No. 209,946, filed July 16, 1962. More particularly, the front end of the base 51 is supported by the front bolster 81 disposed therebelow and the rear end of the base 51 is supported by the rear bolster 82 disposed therebelow, the bolsters 81 and 82 being individually removably supported upon the top flanges 77 of the I-beams 76 in longitudinally spaced-apart relation. The front bolster 81 is selectively secured in place in its supported position upon the top flanges 77, and in turn, is selectively locked to the adjacent bottom front end of the supported base 51; and similarly, the rear bolster 82 is selectively secured in place in its supported position upon the top flanges 77, and in turn, is selectively locked to the adjacent bottom rear end of the supported base 51. The bolsters 81 and 82 in their mounted and secured positions and the base 51 in its mounted and locked position are movable longitudinally along the top flanges 77, as permitted by the members 75. More particularly, as indicated in FIG. 3, the front bolster 81 is free to move along the top flanges 77, while the rear bolster 82 carries structures 83 on the opposite ends thereof that project downwardly therefrom into cooperating and connecting relation with the members 75 respectively carried by the opposite sides of the center sill 71, whereby the members 75 allow only limited and cushioned longitudinal movements of the mounted unit with respect to the center sill 71, whereby the members 75 prevent the transmission of severe longitudinal shocks from the center sill 71 to the connected container 50. In the railway car 70, the members 75 are respectively mounted upon the opposite sides of the center sill 71 by a plurality of longitudinally spaced-apart blocks, not shown, of elastomeric material, such, for example, as rubber; whereby the movements of each member 75 relative to the center sill 71 are not only cushioned, as previously noted, but are also damped, so that the members 75 serve the shock-absorbing function. Hence, the members 75 serve the resilient cushioning function, the shock-absorbing function and the securing function between the center sill 71 of the railway car 70 and the mounted container 50. In passing, it is noted that the two containers 50 mounted upon the top of the center sill 71, as shown in FIG. 2, are independently resiliently mounted and secured in place by the two pairs of members 75 respectively carried by the opposite ends of the center sill 71 upon the respective opposite sides thereof.

The containers 50 may be loaded and unloaded with respect to the railway car 70 in any suitable manner, such, for example, as by the utilization of an overhead gantry crane, not shown, as disclosed in the previously mentioned application of Hassenauer and Enochian.

Figure 20:
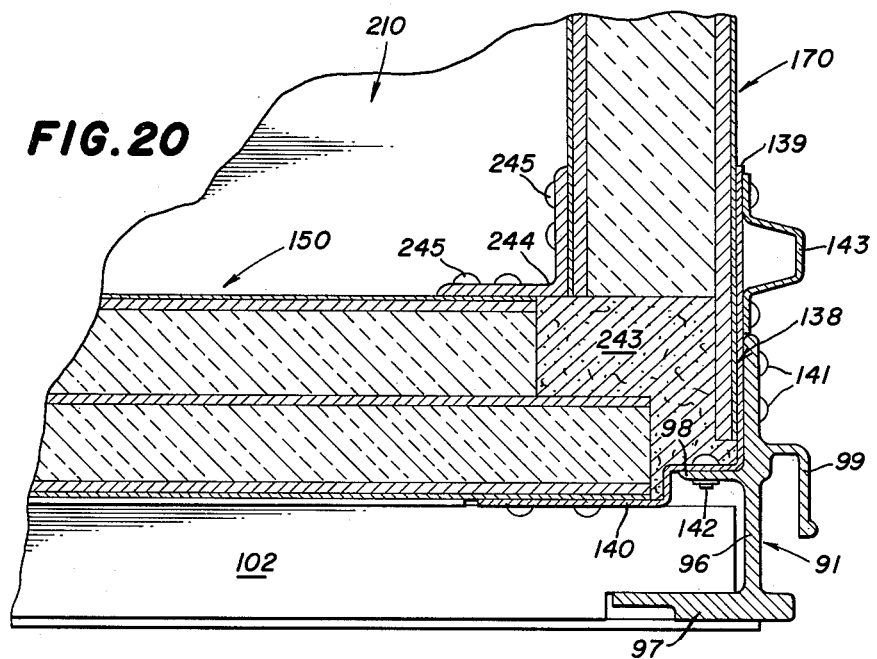
FIG. 20 is a greatly enlarged view of a detail of construction of the corner junction between the floor panel and the side wall panel incorporated in the freight container, as shown in the circle designated 20 in FIG. 16.

Referring now to FIGS. 11 to 16, inclusive, the base 51 of the container 50 is of elongated rectangular form including a pair of longitudinally extending side sills 91, a laterally extending front end sill 92 and a laterally extending rear end sill 93. The front ends of the side sills 91 are respectively rigidly joined to the adjacent ends of the front end sill 92 by a pair of angularly disposed upstanding plates 94, while the rear end sill 93 is arranged between the rear ends of the side sills 91 and rigidly joined thereto. The intermediate portions of the side sills 91 are rigidly tied together by a laterally extending intermediate sill 95 arranged therebetween and rigidly secured thereto at the opposite side ends thereof. The side sills 91 comprise special sections, as best shown in FIG. 20; whereby each of the side sills 91 comprises an upstanding web 96 terminating at the lower end thereof in a laterally extending flange 97, an inwardly and laterally directed ledge 98 carried by the intermediate portion of the web 96, and an outwardly and laterally directed and downwardly turned bumper element 99 carried by the intermediate portion of the web 96. The rear end portions of the flanges 97 of the side sills 91 constitute the previously mentioned structures 54 to which the road bogie 63 is selectively connected, as previously explained; whereby, as shown in FIG. 11, a longitudinally spaced-apart series of holes 97a are provided in each of the flanges 97 for the purpose of accommodating the securing of the road bogie 63 in place to the structures 54 at any one of a plurality of longitudinally spaced-apart positions with respect to the rear end of the base 51. Also, the front end sill 92 carries an upstanding end plate 100, that, in turn, carries two vertically spaced-apart laterally extending and forwardly projecting bumper elements 101, as best shown in FIG. 13.

The front end of the base 51 is especially reinforced due to the selective support thereof by the fifth-wheel mechanism 61 carried by the rear end of the road tractor 62; and more particularly, a laterally extending intermediate sill 102 is disposed rearwardly of the front end sill 92 and between the adjacent end portions of the side sills 91 and rigidly secured thereto. The area of the front end of the base 51 defined between the front end still 92 and the intermediate sill 102 and the adjacent front end portions of the side sills 91 is reinforced by a number of laterally extending and longitudinally spaced-apart members 103 to 115, inclusive, and by a number of longitudinally extending and laterally spaced-apart members 116 to 122, inclusive, all as shown in FIGS. 12, 13, 14 and 15. In the arrangement, the framing members 109, 110, 117 and 121 cooperate to define a substantially box-like pocket 123 in the front central portion of the base 51; and the top of the pocket 123 is closed by a substantially rectangular frame 124 rigidly secured to the members 109, 110, 117 and 121 and by a substantially rectangular cover plate 125 rigidly secured to the top of the frame 124. The framing members 103 to 122, inclusive, are enclosed by top and bottom plates 127 and 128 respectively carried by the corresponding portions of the front end of the base 51. The top plate 127 extends longitudinally between the top of the front end sill 92 and the top of the intermediate sill 102 and extends laterally between the adjacent front end portions of the side sills 91 and is rigidly secured in place and has an opening therein receiving the frame 124, so that the top plate 127 surrounds the frame 124. The bottom plate 128 extends longitudinally between the bottom of the front end sill 92 and the bottom of the intermediate sill 102 and extends laterally between the adjacent front end portions of the side sills 91 and is rigidly secured in place and has a substantially rectangular opening 128a therein communicating with the open bottom of the pocket 123.

A kingpin block 129 is removably secured in place in the pocket 123 and is securely fastened to the framing members 109, 110, 117 and 121; which block 129 carries the previously mentioned depending kingpin 53; which kingpin 53 is disposed along the longitudinal center line of the base 51 and rearwardly of the front end sill 92. When the front end of the base 51 is supported by the fifth-wheel mechanism 61 carried by the rear end of the road tractor 62, as shown in FIG. 1, the fifth-wheel mechanism 61 directly engages the bottom plate 128 and selectively couples and uncouples the kingpin 53 carried by the block 129 securely fastened in place in the pocket 123 to the adjacent framing members 109, 110, 117 and 121.

Figure 12:
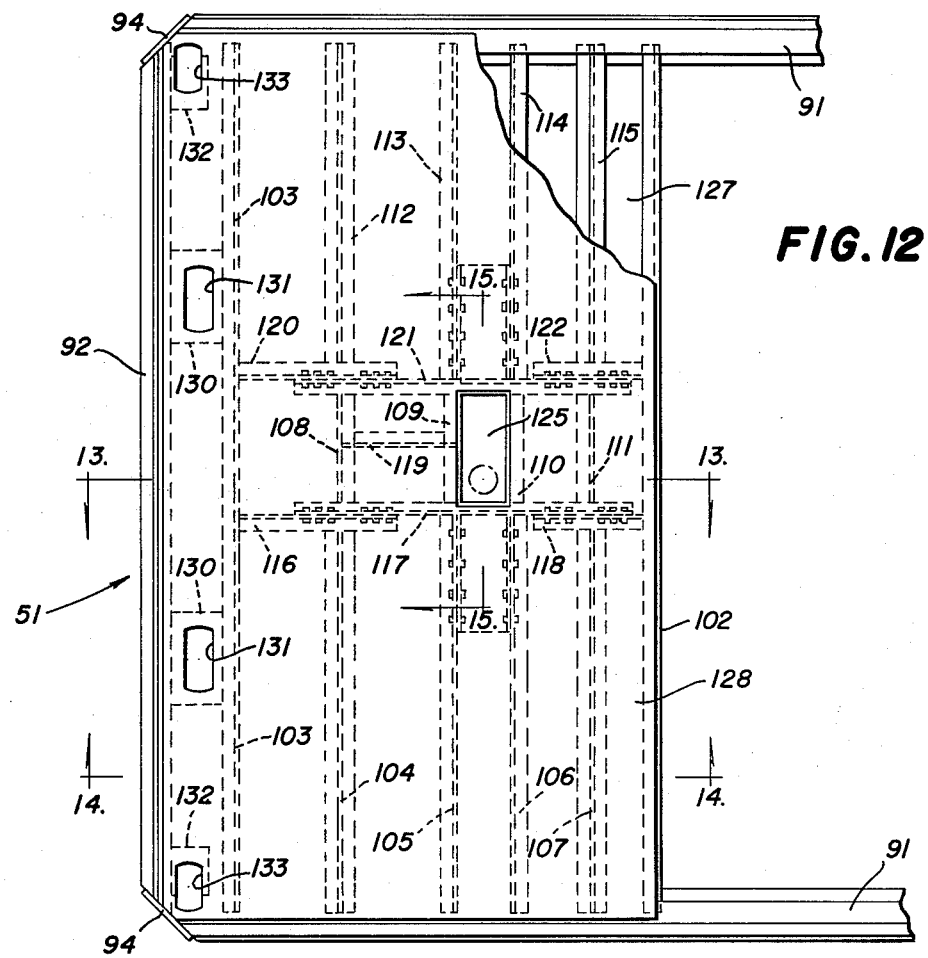
FIG. 12 is an enlarged fragmentary bottom view of the front end portion of the freight container, as shown in FIG. 11.
Figure 14:
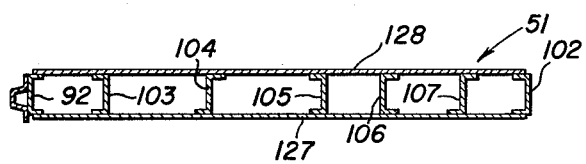
FIG. 14 is another enlarged vertical sectional view of the front end portion of the freight container, this view being taken in the direction of the arrows along the line 14—14 in FIG. 12.

Arranged within the front end of the base 51 are two laterally spaced-apart connecting blocks 130 that are rigidly secured in place between the front end sill 92 and the adjacent framing member 103, as best shown in FIGS. 11, 12 and 13; which blocks 130 are hollow having holes therein communicating with the exterior through respectively aligned connecting holes 131 provided in the front bottom plate 128. Similarly, two laterally spaced-apart stacking blocks 132 are arranged in the front end of the base 51 adjacent to the front corner thereof and rigidly secured in place to the adjacent front end sill 92; which blocks 132 are hollow having holes therein communicating with the exterior through respectively aligned stacking holes 133 provided in the front bottom plate 128.

As best shown in FIGS. 9 and 11, the rear end of the base 51 is especially reinforced; and more particularly, a laterally extending intermediate sill 134 is disposed forwardly of the rear end sill 93 and between the adjacent end portions of the side sills 91 and rigidly secured thereto. The rear end of the base 51 defined between the rear end sill 93 and the intermediate sill 134 is enclosed by a rear top plate 134a and a rear bottom plate 134b, the rear top plate 134a extending longitudinally between the top of the rear end sill 93 and the top of the intermediate sill 134 and laterally between the rear end portions of the side sills 91 and rigidly secured thereto, and the rear bottom plate 134b extending longitudinally between the top of the rear end sill 93 and the top of the intermediate sill 134 and laterally between the rear end portions of the side sills 91 and rigidly secured thereto.

Arranged within the rear end of the base 51 are two laterally spaced-apart connecting blocks, not shown, that are rigidly secured in place between the rear end sill 93 and the adjacent intermediate sill 134, as best shown in FIGS. 9 and 11; which blocks are hollow having holes therein communicating with the exterior through respectively aligned connecting holes 135 provided in the rear bottom plate 134b. Similarly, two laterally spaced-apart stacking blocks, not shown, are arranged in the rear end of the base 51 adjacent to the rear corners thereof and rigidly secured in place to the adjacent rear end sill 93; which blocks are hollow having holes therein communicating with the exterior through respectively aligned stacking holes 136 provided in the rear bottom plate 134b.

In the arrangement, the connecting holes 131 and 135 respectively provided in the front and rear ends of the base 51 are symmetrically disposed with respect to the longitudinal and lateral axes of the base 51, so as to facilitate ready mounting of the base 51 upon the bolsters 81 and 82 carried by the center sill 71 of the railway car 70, without reference to which end of the base 51 happens to be supported by a particular one of the bolsters mentioned. Similarly, the stacking holes 133 and 136 respectively provided in the front and rear ends of the base 51 are symmetrically disposed with respect to the longitudinal and lateral axes of the base 51, so as to facilitate ready stacking of one container 50 upon the top of another container 50, without reference to which end of the top container 50 happens to be positioned over a given end of the bottom container 50.

As best shown in FIGS. 5 and 9, the extreme rear end of the rear bottom plate 134a extends over the top of the rear sill 93 and is rigidly secured thereto; and a laterally extending substantially channel-shaped bumper element 137 is rigidly secured to the extreme rear end of the rear bottom plate 134 and to the rear end sill 93 and projecting rearwardly therefrom. As best shown in FIGS. 16, 20, 21 and 23, two side plates 138 are respectively carried by the side sills 91, each of the side plates 138 being of substantially L-shape including a substantially vertically disposed flange 139 and a substantially horizontally disposed flange 140. As best illustrated in FIG. 20, the lower portion of the vertical flange 139 is suitably secured to the upper portion of the web 96 of the side sill 91 by a series of rivets 141 and the outer portion of the horizontal flange 140 is suitably secured to the ledge 98 carried by the web 96 of the side sill 91 by a series of bolts 142 provided with cooperating nuts. Also, the upper portions of the vertical flanges 139 of the side plates 138 respectively carry two longitudinally extending bumper elements 143 extending laterally outwardly therefrom, as best shown in FIGS. 20 and 21. Further, as best shown in FIGS. 5 and 9, a rear plate 144 is carried by the top of the rear end sill 93 and rigidly secured thereto, the rear plate 144 being substantially Z-shaped in cross section. In the arrangement, the front plate 100, the rear plate 144 and the pair of side plates 138 cooperate to define an upstanding substantially rim-like structure carried by the base 51.

Figure 15:
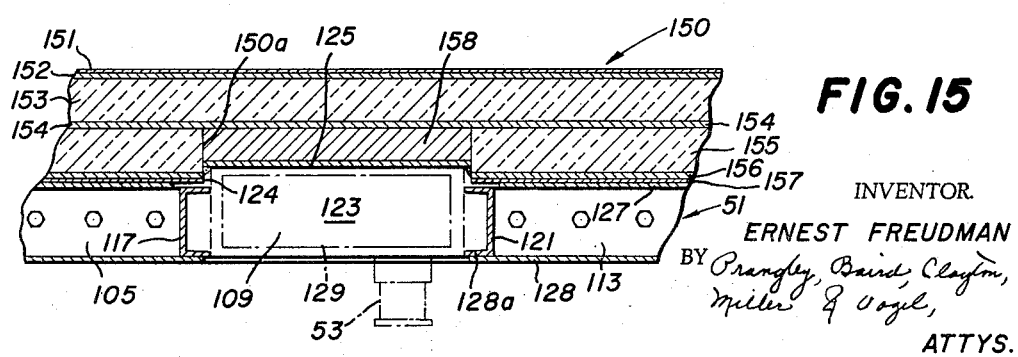
FIG. 15 is another enlarged fragmentary vertical sectional view of the front end portion of the freight container, this view being taken in the direction of the arrows along the line 15—15 in FIG. 12.

Referring now to FIGS. 9, 13, 15, 16, 17, 20, 21, 23 and 26, the base 51 further comprises a floor panel 150 of unitary rigid composite sandwich construction and arranged within the rim-like structure defined by the previously noted elements 100, 144 and 138. Specifically, the floor panel 150 extends longitudinally substantially between the front plate 100 and the rear plate 144 and extends laterally substantially between the side plates 138. More particularly, as shown in FIG. 13, the extreme front end of the floor panel 150 terminates adjacent to the front plate 100 and the front end portion of the floor panel 150 is supported by the front top plate 127. As shown in FIG. 9, the extreme rear end of the floor panel 150 terminates adjacent to the rear end plate 144 and the rear end portion of the floor panel 150 is supported by the rear top plate 134a. As best shown in FIGS. 16, 20 and 26, the opposite sides of the floor panel 150 respectively terminate adjacent to the side sills 91 and the side portions thereof are respectively supported by the horizontal flanges 140 of the side plates 138. Also, as shown in FIG. 11, the intermediate portion of the floor panel 150 is supported upon the top of the intermediate sill 95. As best shown in FIGS. 13 and 15, a substantially rectangular opening 150a is provided in the front central bottom portion of the floor panel 150 in order to receive the upstanding frame 124 and the associated cover plate 125 positioned above the pocket 123 provided in the front central bottom portion of the base 51, so that the front end portion of the floor panel 150 may be supported upon the front top plate 127 in a substantially horizontal position.

As best shown in FIG. 17, the floor panel 150 essentially comprises a top sheet 151 formed of a suitable aluminum alloy and having a thickness of about 0.025", an upper sheet 152 formed of fir plywood and having a thickness of about ¼", an upper layer 153 formed of synthetic organic resin of cellular structure, such, for example, as foamed polystyrene, and having a thickness of about 2", an intermediate sheet 154 formed of fir plywood and having a thickness of about ¼", a lower layer 155 formed of synthetic organic resin of cellular structure, such, for example, as foamed polystyrene, and having a thickness of about 2", a lower sheet 156 formed of fir plywood and having a thickness of about ¼"; and a bottom sheet 157 formed of a suitable aluminum alloy and having a thickness of about 0.025". In the composite sandwich: the adjacent surfaces of the elements 151 and 152 are intimately secured together by an intervening layer of cement indicated at 151a, the adjacent surfaces of the elements 152 and 153 are intimately secured together by an intervening layer of cement indicated at 152a, the adjacent surfaces of the elements 153 and 154 are intimately secured together by an intervening layer of cement indicated at 153a, the adjacent surfaces of the elements 154 and 155 are intimately secured together by an intervening layer of cement indicated at 154a, the adjacent surfaces of the elements 155 and 156 are intimately secured together by an intervening layer of cement indicated at 155a, and the adjacent surfaces of the elements 156 and 157 are intimately secured together by an intervening layer of cement indicated at 156a; which layers 151a, etc., may be formed of a suitable epoxy resin cement.

Figure 28:
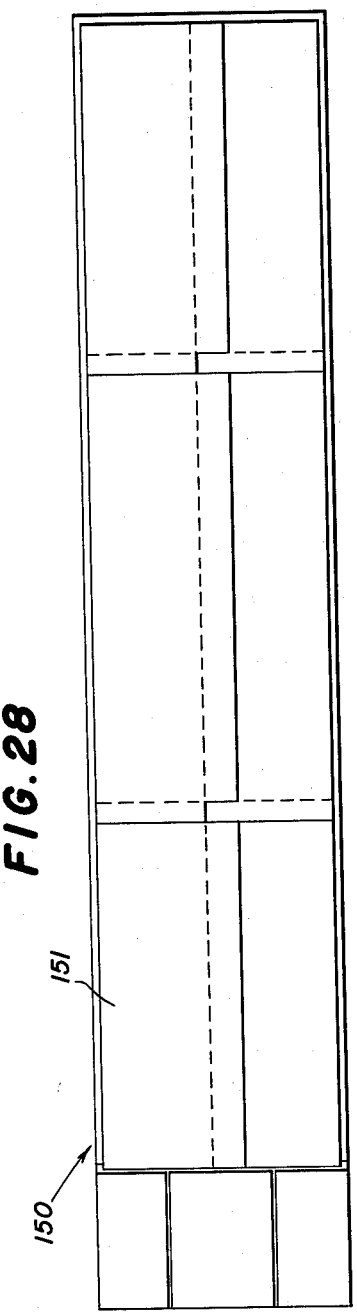
FIG. 28 is a plan view of the floor panel incorporated in the freight container.
Figure 29:
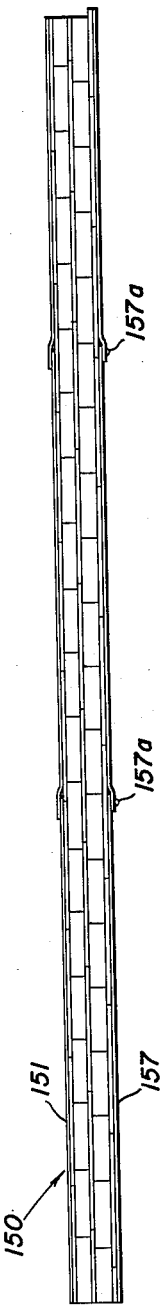
FIG. 29 is a side elevational view of the floor panel, as shown in FIG. 28.
Figure 30:
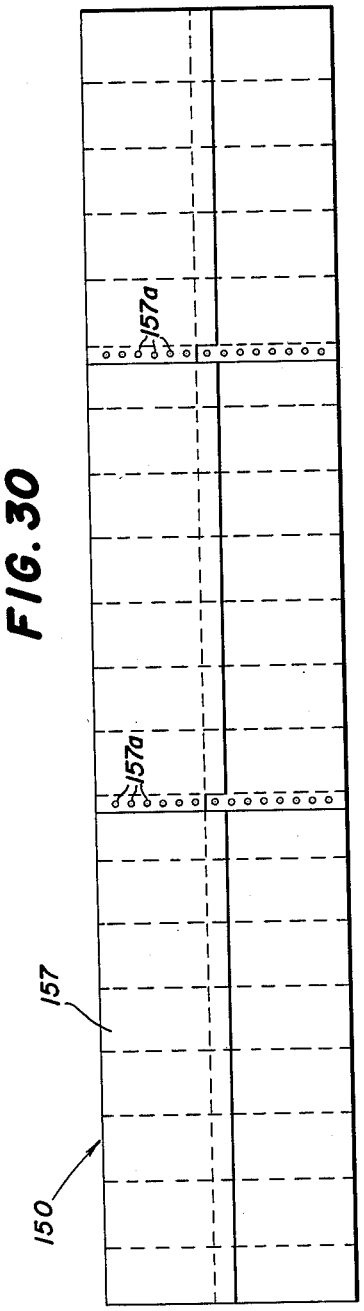
FIG. 30 is a bottom view of the floor panel, as shown in FIGS. 28 and 29.

Referring now to FIGS. 28 to 31, inclusive, in the floor panel 150, each of the elements 151, etc., is of composite construction, because of the large plan area thereof. Thus: the element 151 comprises the nine longitudinally extending sections arranged in the geometry illustrated and suitably joined together at the adjacent edges thereof; the element 152 comprises the eleven laterally extending sections arranged in side-by-side relation and suitably joined together at the adjacent edges thereof; the element 153 comprises the twenty laterally extending sections arranged in side-by-side relation and suitably joined together at the adjacent edges thereof; the element 154 comprises the eleven laterally extending sections arranged in side-by-side relation and suitably joined together at the adjacent edges thereof; the element 155 comprises the twenty laterally extending sections arranged in side-by-side relation and suitably joined together at the adjacent edges thereof; the element 156 comprises the eleven laterally extending sections arranged in side-by-side relation and suitably joined together at the adjacent edges thereof; and the element 157 comprises the six longitudinally extending sections arranged in the geometry illustrated and suitably joined together at the adjacent edges thereof. Specifically, certain of the sections of the element 151 may be suitably overlapped at the adjacent edges thereof and suitably cemented together, utilizing an epoxy resin cement; while other of the sections of the element 151 are located in fixed positions by cementing the same to the underlying upper sheet 152, all as illustrated in FIG. 28. The several sections of the element 157 may be suitably overlapped at the adjacent edges thereof and suitably cemented together utilizing an epoxy resin cement, as illustrated in FIG. 30. Moreover, the laterally extending overlapped portions of the sections of the element 157 may be further secured together by employing corresponding rows of nails 157a, as illustrated in FIG. 30. In each of the other elements 152, 153, 154, 155 and 156 the adjacent edges of the sections thereof may be merely cemented together in abutting relation, utilizing an epoxy resin cement. In the assembly of the floor panel 150, the joints between the several sections of the elements 152, 153, 154, 155 and 156 are staggered longitudinally through the thickness of the floor panel and between the elements 151 and 157, as indicated by the elongated broken line 150b, as shown in FIG. 31. This arrangement is very advantageous as it materially increases the strength and rigidity of the composite floor panel 150. Finally, it is mentioned that the elements 151 and 157 being formed of metal serve to prevent penetration of the interior of the floor panel 150 by water, moisture, etc., either from the inside of the body 52 or from the exterior thereof, the element 157 constituting the usual exterior weather sheet in the floor panel 150. The general arrangement of the staggered joints mentioned in the floor panel 150 are also illustrated in FIG. 29.

Again referring to FIGS. 13 and 15, the opening 150a provided in the front central bottom portion of the floor panel 150 and receiving the frame 124 and the top cover plate 125 extends through the elements 157, 156 and 155 thereof; and a wooden block 158 is arranged in the top of the opening 150a so as to fill the same and to serve as a weight transmission element between the element 154 of the floor panel 150 and the top cover plate 125.

The composite floor panel 150 is securely fastened to the supporting elements 100, 144 and 138 of the base 51, as explained more fully hereinafter; whereby the floor panel 150 constitutes the fundamentally strong rigid structural element that is incorporated in the base 51.

Figure 19:
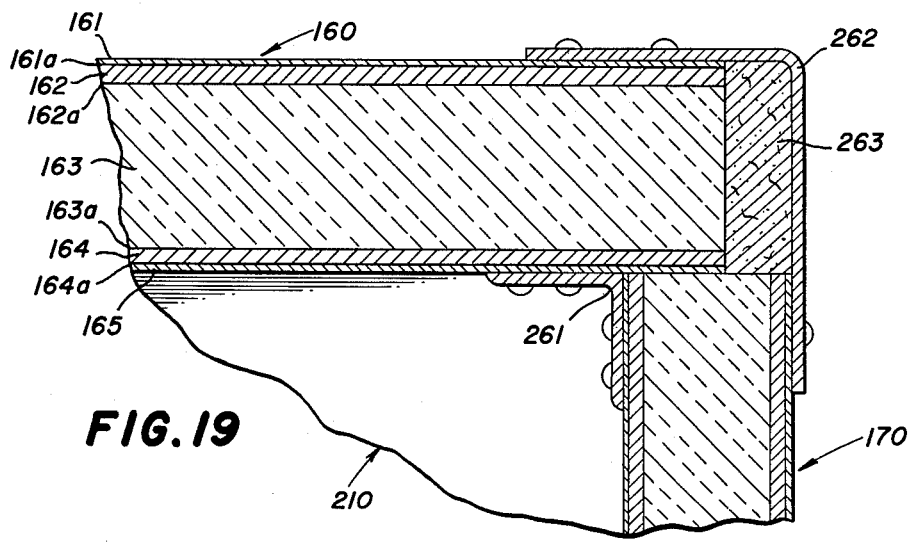
FIG. 19 is a greatly enlarged view of a detail of construction of the corner junction between the roof panel and the side wall panel incorporated in the freight container, as shown in the circle designated 19 in FIG. 16.

Referring now to FIGS. 4, 16, 19, 21, 22 and 26, the body 52 of the container 50 is of strong rigid unitary structure comprising, in addition to the floor panel 150, a ceiling or roof panel 160 of rigid composite sandwich construction that extends from end to end and from side to side thereof, as best shown in FIGS. 4, 16 and 21. The roof panel 160 comprises, as best shown in FIG. 19, a top sheet 161 formed of a suitable alloy of aluminum and having a thickness of about 0.025", an upper sheet 162 formed of fir plywood and having a thickness of about ¼", a layer 163 formed of synthetic organic resin of cellular structure, such, for example, as foamed polystyrene, and having a thickness of about 4", a lower sheet 164 formed of fir plywood and having a thickness of about ¼" and a bottom sheet 165 formed of a suitable alloy of aluminum and having a thickness of about 0.025". In the roof panel 160: the adjacent surfaces of the elements 161 and 162 are intimately secured together by a layer of cement indicated at 161a, the adjacent surfaces of the elements 162 and 163 are intimately secured together by a layer of cement indicated at 162a, the adjacent surfaces of the elements 163 and 164 are intimately secured together by a layer of cement indicated at 163a, and the adjacent surfaces of the elements 164 and 165 are intimately secured together by a layer of cement indicated at 164a; which layers 161a, etc., may be formed of a suitable epoxy resin cement. In the roof panel 160, each of the elements 161, etc., is of composite construction, and the elements 161, 162, etc., are so organized so as to eliminate overlapped joints through the roof panel 160; which arrangement has not been illustrated in the interest of brevity, but will be readily understood from the foregoing description of the organization of the elements 151, etc., incorporated in the floor panel 150.

Referring now to FIGS. 3, 16, 18, 19, 20, 24 and 25 the body 52 also comprises a pair of longitudinally extending and laterally spaced-apart upstanding front side wall panels 170 and a pair of longitudinally extending and laterally spaced-apart upstanding rear side wall panels 180; all of the side wall panels 170 and 180 being identical and each thereof being of rigid composite sandwich construction. The two front side wall panels 170 are respectively disposed in positions of longitudinal alignment with the two rear side wall panels 180, but respectively disposed in forwardly spaced-apart relation therewith to define two upstanding and laterally aligned doorways 190 in the opposite sides of the body 52. Also, the floor panel 150, the roof panel 160 and the side wall panels 170 and 180 cooperate with other structure described hereinafter to define a heat-insulated substantially box-like lading compartment 191 within the body 52 and readily accessible through the doorways 190. As best shown in FIG. 18, the front side wall panel 170, there illustrated, comprises an inside sheet 171 formed of a suitable alloy of aluminum and having a thickness of about 0.025", an inner sheet 172 formed of fir plywood and having a thickness of about ¼", a layer 173 formed of synthetic organic resin of cellular structure, such, for example, as foamed polystyrene, and having a thickness of about 3", an outer sheet 174 formed of fir plywood and having a thickness of about ¼", and an outside sheet 175 formed of a suitable alloy of aluminum and having a thickness of about 0.025". In the front side wall panel 170: the adjacent surfaces of the elements 174 and 172 are intimately secured together by a layer of cement indicated at 171a, the adjacent surfaces of the elements 172 and 173 are intimately secured together by a layer of cement indicated at 172a, the adjacent surfaces of the elements 173 and 174 are intimately secured together by a layer of cement indicated at 173a, and the adjacent surfaces of the elements 174 and 175 are intimately secured together by a layer of cement indicated at 174a; which layers 171a, etc., may be formed of a suitable epoxy resin cement. In the front side wall panel 170, each of the elements 171, etc., is of composite construction, and the elements 171, 172, etc., are so organized so as to eliminate overlapped joints in the front side wall panel 170; which arrangement has not been illustrated in the interest of brevity, but will be readily understood from the foregoing description of the organization of the elements 151, etc., incorporated in the floor panel 150.

Referring now to FIGS. 10, 16, 21, 24 and 26, the body 52 further comprises a laterally extending upstanding front end wall panel 200 disposed at the front end thereof, a laterally extending upstanding bulkhead wall panel 210 disposed rearwardly of the front end wall panel 200, and a pair of longitudinally extending and laterally spaced-apart upstanding divider wall panels 220 and 230 arranged betwen the front end wall panel 200 and the bulkhead wall panel 210. Each of the wall panels 200, 210, 220 and 230 is of rigid composite sandwich construction; and the wall panels 200, 210, 220 and 230 are of identical construction and of the same construction as the front side wall panel 170, as previously described. Accordingly, as shown in FIG. 27, the divider panel 230 comprises the elements 231, 231a, 232, 232a, 233, 233a, 234, 234a and 235 respectively corresponding in construction and arrangement to the elements 171, 171a, 172, 172a, 173, 173a, 174, 174a and 175 of the front side wall panel 170, as previously described in conjunction with FIG. 18.

Continuing the reference to FIGS. 10, 16, 21, 24 and 26, the front end of the floor panel 150, the front end of the roof panel 160, the front end wall panel 200, the bulkhead wall panel 210 and the pair of divider wall panels 220 and 230 cooperate to define a heat-insulated substantially box-like space in the front central portion of the body 52; which space is divided by a substantially horizontally disposed baffle 192 into an upper plenum chamber 193 and a lower duct chamber 194, the baffle 192 extending mutually between the wall panels 200, 210, 220 and 230 for the dividing purpose mentioned. Openings 211 and 212 are respectively formed through the upper and lower central portions of the bulkhead wall panel 210; an opening 195 is formed through a side portion of the baffle 192; and duct structure 196 is arranged in the duct chamber 194 and interconnecting the openings 195 and 212. Thus, air from the upper portion of the lading chamber 191 may be circulated through the opening 211 into the plenum chamber 193 and then downwardly through the opening 195 via the duct structure 196 and through the opening 212 and thence back into the lower portion of the lading chamber, as best shown in FIG. 21, and for a purpose more fully explained subsequently.

Preferably, a reticulated member or screen 213 is arranged in covering relation with the opening 211, as shown in FIG. 16, in order to prevent the circulation of trash, etc., from the lading compartment 191 into the plenum chamber 193.

The front end of the floor panel 150, the front end of the roof panel 160, one end portion of the bulkhead wall panel 210 and the divider wall panel 220 cooperate to define a machinery compartment 197 in one front corner of the body 52 that is disposed exteriorly of the heat-insulated chambers 193 and 194 and exteriorly of the heat-insulated lading compartment 191; and similarly, the front end of the floor panel 150, the front end of the roof panel 160, the other end portion of the bulkhead wall panel 210 and the divider wall panel 230 cooperate to define a fuel tank compartment 198 in the other front corner of the body 52 that is disposed exteriorly of the heat-insulated chambers 193 and 194 and exteriorly of the heat-insulated lading compartment 191; all as clearly shown in FIGS. 24 and 26.

As shown in FIGS. 10, 21 and 24, an opening 201 is formed in the lower central portion of the front end wall 200; and two substantially cup-shaped casings 202 and 203 are arranged in spaced-apart nested relation and secured in place within the opening 201, the space between the casings 202 and 203 being filled with a layer 204 of synthetic organic resin of cellular structure, such, for example, as foamed polyurethane. The casing 203 surrounds the casing 202 and projects rearwardly into the lower front portion of the lower duct chamber 194, so that the casing 202 defines an instrument chamber 205 therein and disposed rearwardly of the front end wall 200 and opening to the exterior through the front end wall 200. Thus, the layer 204 disposed between the casings 202 and 203 constitutes heat insulation between the instrument chamber 205 and the lower duct chamber 194; and arranged within the instrument chamber 205 are certain instruments and meters 206 and 207 that are employed for a purpose described subsequently. Also, as shown in FIGS. 24 and 26, a substantially rectangular opening 221 is provided in the upper central portion of the divider wall panel 220 and communicating between the upper plenum chamber 193 and the upper portion of the machinery compartment 197; which opening 221 is employed for a purpose described subsequently.

The extreme front end of the floor panel 150 is positioned somewhat rearwardly of the front end plate 100 to provide a laterally extending void therebetween that is filled with a body 241 of synthetic organic resign of cellular structure, such, for example, as foamed polyurethane resin, as shown in FIGS. 13 and 21, thereby further to secure the floor panel 150 in its supported position within the base 51. The extreme rear end of the floor panel 150 is positioned somewhat forwardly of the rear end plate 144 to provide at laterally extending void therebetween that is filled by a wooden block or timber 242, as shown in FIG. 9. The opposite sides of the floor panel 150 are respectively positioned laterally inwardly with respect to the adjacent side plates 138 to provide two corresponding longitudinally extending voids therebetween that are respectively filled with two bodies 243 of synthetic organic resin of cellular structure, such, for example, as foamed polyurethane resin, as shown in FIGS. 16, 20, 23 and 26, thereby further to secure the floor panel 150 in its supported position within the base 51.

The lower end of each of the front side wall panels 170 and the lower end of each of the rear side wall panels 180 is arranged in abutting relation with the adjacent inner surface of the vertical flange 139 of the associated side plate 138, as best shown in FIGS. 16, 20 and 24, and is securely held in place with respect thereto by an intervening layer of cement, not shown, such, for example, as epoxy resin cement. Also, the extreme lower ends of the side wall panels 170 and 180 are secured in place by the previously mentioned adjacent bodies 243 of resin disposed immediately therebelow. Further, longitudinally extending angle members 244 are arranged at the joints between the sides of the floor panel 150 and the lower ends of the side wall panels 170 and 180; which members 244 are respectively secured to the floor panel 150 and to the side wall panels 170 and 180 employing fasteners 245. The extreme lower end of the front end panel 200 is supported upon the adjacent front end of the floor panel 150 and in abutting relation with the inner surface of the front end plate 100, as best shown in FIGS. 21 and 24, and is suitably cemented thereto, employing, for example, epoxy resin cement. Also, the lower end of the front end panel 200 is held in place by the previously mentioned adjacent body 241 of resin; and further, the lower end of the front end wall panel 200 is firmly fastened to the front end of the floor panel 150 by an angle member 246 suitably secured therebetween. Similarly, the extreme lower end of the bulkhead wall panel 210 is supported upon the floor panel 150 and firmly fastened in place by angle members 247 suitably secured therebetween, as best shown in FIG. 24. Likewise, the extreme lower ends of the divider wall panels 220 and 230 are supported upon the floor panel 150 and firmly fastened in place by respective pairs of angle members 247 and 248, as best shown in FIGS. 24 and 26.

Referring now to FIGS. 21, 22, 23, 24 and 25, the side doorway 190 between the front side wall panel 170 and the rear side wall panel 180 at each side of the body 52 is framed by a pair of upstanding wooden blocks or timbers 251, a lower wooden block of timber 252 and an upper wooden block or timber 253. As shown in FIG. 24, one of the timbers 251 is fastened in place to the adjacent end of the rear end wall panel 180 by two angle members 254 and 255 respectively secured therebetween, and the space between the end of the rear side wall panel 180 and the timber 251 is filled by a body 256 of synthetic organic resin of cellular structure, such, for example, as foamed polyurethane; and the other of the timbers is similarly fastened in place to the adjacent end of the front end wall panel 170 by like structure. As shown in FIG. 23, the lower timber 252 is fastened in place to the vertical flange 139 of the side plate 138 by an angle member 257 secured therebetween and by the previously mentioned body 243 of resin; and also the lower timber 252 is fastened in place to the adjacent side of the floor panel 150 by an angle member 258 secured therebetween. The top inner edge of the lower timber 252 is disposed above the top outer edge thereof and is trimmed by an inverted U-shaped member 259 firmly secured thereto. As shown in FIG. 22, the upper timber 253 is fastened in place to the adjacent bottom side of the roof panel 160 by an inside side angle member 261 secured therebetween and fastened in place to the adjacent top side of the roof panel 160 by an outside side angle member 262 secured therebetween. Also, a body 263 of synthetic organic resin of cellular structure, such, for example, as foamed polyurethane, is arranged to fill the space between the top of the upper timber 253, the side end of the roof panel 160, the inside side member 261 and the outside side member 262.

The roof panel 160 is supported upon the top ends of the side wall panels 170 and 180, the end wall panel 200, the bulkhead wall panel 210 and the divider wall panels 220 and 230. The top ends of the side wall panels 170 and 180 are secured to the adjacent side portions of the roof panel 160 by the previously mentioned elements 261, 262 and 263, since these elements not only secure the top timbers 253 in place over the side doorways 190, as previously described in conjunction with FIG. 22, but extend longitudinally along the opposite sides of the roof panel 160 from end to end thereof, as shown in FIGS. 4, 16, 19, 21, 22, 24 and 26. In a similar manner, the top end of the front end wall panel 200 is secured to the adjacent front end portion of the roof panel 160 by the elements 271, 272 and 273 that respectively correspond in structure to the above described elements 261, 262 and 263, as best shown in FIGS. 4, 10, 21 and 24. In the arrangement, the outside front end member 272 extends laterally across the front end of the roof panel 160.

Furthermore, the top end of the bulkhead wall panel is fastened to the adjacent portion of the roof panel 160 by angle members 264 secured therebetween, as shown in FIG. 21, and with a body 265 of foamed resin therebetween; and the top ends of the divider wall panels 220 and 230 are similarly fastened to the adjacent portions of the roof panel 160, respectively utilizing the angle members 266 and 267 and the resin bodies 268 and 269, as shown in FIG. 26.

Referring now to FIGS. 1, 2, 3, 4, 21, 22, 23, 24 and 25, the side doorways 190 provided in the opposite sides of the body 52 carry corresponding pairs of side doors 280 and 290 respectively hinged adjacent to the front side wall panel 170 and to the rear side wall panel 180, the two side doors 280 and 290 of each pair being hinged for outward movements into open positions, as indicated by the dotted lines 286 and 296 in FIG. 4. As best shown in FIG. 25, the front side door 280 constitutes an inner side door in the sense that it must be first closed and the rear side door 290 constitutes an outer side door in the sense that it must be last closed. Specifically, the side door 280 is hinged by three vertically spaced-apart hinges 287 to the angle member 254 and the timber 251 disposed at the end of the front side wall panel 170; and similarly, the side door 290 is hinged by three vertically spaced-apart hinges 297 to the angle member 254 and the timber 251 disposed at the end of the rear side wall panel 180; all as shown in FIGS. 3 and 25.

The side door 280 is of composite sandwich construction that corresponds to that of the adjacent front side wall panel 170, except that the side door 280 does not comprise an inside sheet corresponding to the element 271 of the front side wall panel 170, all as previously described in conjunction with FIG. 18; whereby the side door 280 comprises the elements 282, 282a, 283, 283a, 284, 284a and 285, as indicated in FIG. 25. The side door 290 is of composite sandwich construction that corresponds to that of the side door 280; whereby the side door 290 comprises the corresponding elements 292, 292a, 293, 293a, 294, 294a and 295, as indicated in FIG. 25. The side door 280 is generally rectangular and comprises a rectangular edge boundary frame 288 having a variable configuration about the four sides thereof appropriate to an inside door; and the side door 290 is generally rectangular and comprises a rectangular edge boundary frame 298 having a variable configuration about the four sides thereof appropriate to an outside door. In the doors 280 and 290, the sides of the respective frames 288 and 298 are secured in place by respective bodies 289 and 299 of synthetic organic resin of cellular structure, such, for example, as foamed polyurethane. The frame 288 of the inner door 280 comprises an outwardly facing rear side edge 288a, and the frame 298 of the outer door 290 comprises an inwardly facing stepped front side edge 298a; which side edges 288a and 298a interfit with deformable sealing gaskets 301 therebetween, as shown in FIG. 25. Also, the frame 298 comprises a stepped top edge 298b that interfits cooperating angle members 302 and 303 rigidly secured to the top timber 253, with deformable sealing gaskets 304 therebetween, as shown in FIG. 22; further, the frame 298 comprises a stepped bottom edge 298c that interfits the cooperating angle members 257 and 259 rigidly secured to the bottom timber 252, with deformable sealing gaskets 305 therebetween, as shown in FIG. 23; and finally, the frame 298 comprises a flat rear side edge 298d that cooperates with the angle members 254 and 255 rigidly secured to the side timber 251 disposed at the front end of the rear side wall panel 180, with deformable sealing gaskets 306 therebetween, as shown in FIG. 25. The construction of the other three sides of the frame 288 are identical to the three corresponding sides 298b, 298c and 298d of the frame 298, as described above, and have not been illustrated in the interest of brevity.

Finally, the side door 290 carries latch structure of a conventional type that includes a latch bar 307 carrying a rotatable handle 308 which is rotatable into a latched position engaging the side door 280 and actuating the latch bar 304 into its latched position; and the side door 280 carries lock structure 309 co-operating with the handle 308 to lock the handle 308 in its latched position, all as shown in FIG. 3.

Referring now to FIGS. 3, 4, 5, 6, 7, 8, 9, 21 and 24, the extreme rear ends of the floor panel 150, the roof panel 160 and the rear side wall panels 180 are framed to provide a rear doorway 310 in the rear end of the body 52 and communicating with the adjacent rear end of the lading compartment 191. As best shown in FIG. 9, the extreme rear end of the floor panel 150 terminates at the bottom timber 242 that is anchored to the rear end plate 144, as previously explained; which rear timber 242 carries a forwardly directed substantially Z-shaped member 311 securely fastened thereto; which member 311 carries a flange 312 overlying the extreme rear end of the floor panel 150; whereby the rear end plate 144 and the member 311 cooperate to frame the bottom of the rear doorway 310.

The extreme rear end of the roof panel 160 carries a laterally extending top outside framing member 320, as best shown in FIGS. 5 and 8; which framing member 320 preferably comprises an extrusion including a top flange 321, a bottom flange 322 and a rearwardly and downwardly curved transition section 323, as well as a pair of inwardly directed anchoring flanges 324 and 325 respectively carried adjacent to the outer portion of the top flange 321 and adjacent to the upper portion of the bottom flange 322. Also, the extreme rear end of the roof panel 160 carries a laterally extending top inside framing member 326 that is substantially L-shaped including a top flange 327 and a bottom flange 328. A laterally extending top wooden block or timber 329 is arranged between the bottom flanges 322 and 328 of the respective members 320 and 326 and is secured thereto; and further, a body 330 of synthetic organic resin of cellular structure, such, for example, as foamed polyurethane is arranged as a filler in the space defined mutually between the extreme rear end of the roof panel 160 and the elements 320, 326 and 329, and embedding the anchoring flanges 324 and 325, thereby further to bond together the elements mentioned. Further, the top timber 329 carries inside and outside angle members 331 and 332 defining a stepped structure at the bottom edge thereof, as shown in FIG. 8.

The extreme rear ends of the rear side wall panels 180 are framed by structure that is substantially identical to that described above which is utilized to frame the extreme rear end of the roof panel 160; whereby, as best shown in FIGS. 5 and 7, the framing structure for the extreme rear end of each of the rear side wall panels 180 comprises the side outside framing member 340, including the elements 341, 342, 343, 344 and 345, the side inside framing member 346, including the elements 347 and 348, the wooden block or timber 349, the resin body 350, and the members 351 and 352.

Figure 6:
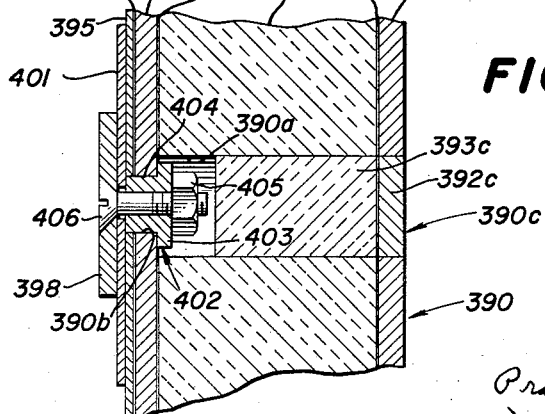
FIG. 6 is a greatly enlarged vertical sectional view taken through one of the rear doors incorporated in the rear end of the freight container, this view being taken in the direction of the arrows along the line 6—6 in FIG. 5.

Referring now to FIGS. 5, 6, 7, 8 and 9, the rear doorway 310 provided in the rear end of the body 52 carries a pair of rear doors 380 and 390 respectively hinged at the outer side edges thereof to the respectively adjacent outside side framing members 340. The rear doors 380 and 390 respectively comprise inner and outer doors, as previously explained, with reference to the corresponding side doors 280 and 290. The end doors 380 and 390 are of identical composite sandwich construction, and also of the same construction as that of the side door 290; whereby the rear door 390 comprises, as best shown in FIG. 6, the corresponding elements 392, 392a, 393, 393a, 394, 394a and 395. The rear door 380 is carried by the four vertically spaced-apart hinges 386, and the rear door 390 is carried by the four vertically spaced-apart hinges 396, the doors 380 and 390 both swinging outwardly into their open positions. The hinges 387 and 397 are identical; and, as best shown in FIGS. 6 and 7, the hinge 396 comprises two sections 397 and 398 connected together by an associated pintle 399. The hinge section 397 has a substantially arcuate shape and is rigidly secured to the adjacent side outside framing member 340 by fasteners, not shown, that extend through openings provided in the member 340 and then into a substantially arcuate-shaped anchor plate 400 arranged interiorly of the member 340, as shown in FIG. 7. The hinge section 398 extends inwardly over the adjacent outside sheet 395 of the associated rear door 390 and is securely fastened to an associated reinforcing plate 401 that is firmly anchored to the rear door 390, and also to the outer sheet 394 of the rear door 390.

This arrangement is illustrated in FIG. 6, wherein it will be observed that in the rear door 390 a large bore 390a is formed through the elements 392 and 393, and an aligned small bore 390b is formed through the elements 394 and 395. A hollow bushing 402 is provided that has a large head 403 and a small barrel 404; and the bushing 402 is inserted through the bore 390a and placed so that the barrel 404 projects through the bore 390b leaving the head 403 in the bore 390a. Also, a nut 405 is arranged in the bore 390a and a screw 406 is projected shank-first from the exterior through aligned holes provided in the hinge section 398 and in the reinforcing plate 401 and thence through the hollow bushing 402 into cooperating relation with the nut 405. The screw 406 is then tightened with respect to the nut 405; whereby the elements 398, 401, 395, 394 and 402 are firmly clamped together between the enlarged head of the screw 406 located in a counterbore provided in the hinge section 398 and the nut 405 located in the adjacent end of the bore 390a. Thereafter, a plug 390c is cemented in place in the bore 390a in order to fill the inner end thereof. In fact, the plug 390c may comprise an original part of the rear door 390 that is produced by a cylindrical cutter or saw in providing the bore 390a in the elements 392 and 393; whereby the plug 390c comprises the corresponding structural elements 392c and 393c, in an obvious manner. Each of the hinge sections 398 is fastened to the rear door by two such constructions, as described above, employing two corresponding screws 406, as indicated in FIG. 5.

The rear doors 380 and 390 are respectively reinforced adjacent to the lower outside portions thereof by two corresponding plates 410 and 420 respectively rigidly secured thereto, as shown in FIG. 5. The rear door 380 carries latching mechanism including a vertical latch bar 411 carrying a rotary handle 412, the handle 412 being rotated to a latched position engaging the adjacent plate 410 to actuate the latch bar 411 into its latched position; and the plate 410 carries lock structure 413 cooperating with the handle 412 and arranged to lock the same in its latched position engaging the plate 410. The rear door 390 carries identical latching mechanism, including the elements 421 and 422, and lock structure 324. The latching mechanisms and lock structures described above are of conventional construction and arrangement and have not been illustrated in detail in the interest of brevity.

Referring now to FIG. 24, the rear doors 380 and 390 respectively carry upstanding flue structures 414 and 424 that assist in maintaining the circulation of the air currents through the lading compartment 191, as previously described in conjunction with FIG. 21; whereby the cold passing through the opening 212 in the bulkhead wall panel 210 moves rearwardly along the floor panel 150 and passes upwardly through the flue structures 414 and 424, when the rear doors 380 and 390 occupy their closed positions, and the resulting warm air then moves forwardly along the roof panel 160 and back through the upper opening 211 in the bulkhead wall panel 210, thereby to cool or refrigerate the lading contained in the lading compartment 191 in a manner more fully explained hereinafter. Referring now to FIGS. 7, 8 and 9, the flue structure 424 that is carried by the rear door 390 essentially comprises an upstanding substantially rectangular flue sheet 425 formed of fir plywood and having a thickness of ¼". The sheet 425 extends substantially from side to side of the inner sheet or element 392 of the rear door 390 and is secured thereto by a pair of upstanding laterally spaced-apart wooden spacing strips 426. Thus, the flue sheet 425 is spaced forwardly of the inner sheet 392 and cooperates therewith and with the upstanding spacing strips 426 to define an upstanding flue 427 having open bottom and top ends; whereby the flue 427 assists in maintaining circulation of air in the lading compartment 191, in the manner described above.

Referring now to FIGS. 7, 8 and 9, the rear door 390 is provided with a boundary frame 430 appropriate to an outer door and including a stepped top member 431 arranged to fit the top members 331 and 332 carried by the top timber 329, with deformable sealing gaskets 432 therebetween, and a stepped bottom member 433 arranged to fit the rear end plate 144 and the bottom member 311 carried by the extreme outer end of the floor panel 150, with deformable sealing gaskets 434 therebetween, and an outer side member 435 arranged to fit the side members 351 and 352 carried by the side timber 349, with deformable sealing gaskets 436 therebetween. Also, the boundary frame 430 includes an inner side member, not shown, arranged to fit the inner side member, not shown, carried by the boundary frame of the rear door 380, with sealing gaskets, not shown, therebetween. Finally, it is noted that the rear door 380 is provided with the previously mentioned boundary frame, not shown, appropriate to an inner door; which arrangement is fundamentally the same as that previously described in conjunction with the side doors 280 and 290, as shown in FIG. 25.

Referring now to FIGS. 3, 4, 24 and 26, the extreme front end of the floor panel 150 and the roof panel 160 carry two upstanding corner posts 441 and 451 extending therebetween and rigidly secured thereto; which corner post 441 cooperates with an upstanding framing member 442 carried by the extreme front end of the adjacent front side wall panel 170, with the front end of the adjacent bottom side plate 138 and with the front end of the adjacent top side members 262 to define an upstanding substantially rectangular side doorway 443 into the adjacent machinery compartment 197; and which corner post 451 cooperates with an upstanding framing member 452 carried by the extreme front end of the adjacent front side wall panel 170, with the front end of the adjacent bottom side plate 138 and with the front end of the adjacent top side member 262 to define an upstanding substantially rectangular side doorway 453 into the adjacent fuel storage tank compartment 198. The space between the corner post 441 and the adjacent end of the front end wall panel 200 and between the front bottom plate 100 and the top front member 272 is normally closed by a removable sheet 444, whereby only the side doorway 443 is normally open into the machinery compartment 197; and the space between the corner post 451 and the adjacent end of the front end wall panel 200 and between the front bottom plate 100 and the top front member 272 is normally closed by a removable sheet 454, whereby only the side doorway 453 is normally open into the fuel tank storage compartment 198.

Referring now to FIGS. 3, 4, 21, 24 and 26, the container 50 is provided with a removable refrigerating machine and internal combustion engine therefor; and specifically, an upstanding main casing 461 is removably arranged in the machinery compartment 197, being readily placed and removed with respect thereto through the side doorway 443; which main casing 461 carries a rearwardly projecting auxiliary casing 462 provided with a communicating rearwardly positioned duct 463, as best shown in FIG. 26, the auxiliary casing 462 and the duct 463 being projected through the opening 221 provided in the divider wall panel 220 and into the plenum chamber 193, when the main casing 461 occupies its normal position in the machinery compartment 197. The refrigerating machine mentioned is of the compressor-condenser-evaporator type and the internal combustion engine is of a conventional type that is operative employing liquified petroleum gas, such as butane, as a fuel. The internal combustion engine is operatively connected to the compressor and both of the elements, along with the condenser, are housed in the main casing 461. The evaporator is housed in the auxiliary casing 462, and a blower is housed in the duct 463. The auxiliary casing 462 communicates at the top thereof with the plenum chamber 193 and at the rear thereof with the adjacent front of the duct 463, while the bottom of the duct 463 communicates with the opening 195 provided in the horizontal baffle 192. Thus, when the refrigerating machine is operated, the evaporator is cooled and the blower draws air into the top of the auxiliary casing 462 and over the evaporator and discharges the cool air through the duct 463 and thence through the opening 195 provided in the horizontal baffle 192 and into the duct structure 196 disposed in the duct chamber 194, whereby the air is circulated through the lading compartment 191 defined in the container 50, all in the manner previously explained in conjunction with FIG. 21.

Again referring to FIGS. 3, 4 and 26, the front of the main casing 461 is provided with louvered structure, indicated at 464, so as to supply air both to the internal combustion engine and to the condenser, and both the exhaust from the internal combustion engine and the air that is circulated over the condenser are discharged from the top of the main casing 461 into an upstanding hood 465 carried by the top of the main casing 461 and movable therewith into and out of the machinery compartment 197 through the side doorway 443. The top end of the hood 465 is open and communicates with flue structure formed in the portion of the roof panel 160 disposed immediately thereabove; which flue structure communicates with the atmosphere. As best shown in FIGS. 4 and 26, an opening 466 is formed in the front end and in one side of the roof panel 160; which opening 466 is positioned over the top of the machinery compartment 197. The opening 466 is lined by associated structure 467 that carries a bottom baffle 468 and a top baffle 469. The two baffles 468 and 469 have offset holes 468a and 469a respectively formed therein, with the hole 468a positioned immediately above the open top of the hood 465; thereby to define the previously mentioned flue through the roof panel 160 and communicating between the top open end of the hood 465 and the exterior atmosphere. The offset arrangement of the holes 468a and 469a in the respective baffles 468 and 469 prevents rain, snow and the other elements of weather from falling directly through the hood 465 into the top of the main casing 461. When the casing 461 occupies its normal position in the machinery compartment 197, it may be securely fastened in place employing the strap-like devices indicated at 471 in FIG. 26.

Referring now to FIGS. 24 and 26, two upstanding pressure bottles or tanks 481 are suitably removably secured in place in the fuel tank storage compartment 198, employing strap-like devices 472; which tanks 481 store liquified butane and are suitably connected to supply this fuel to the internal combustion engine housed in the main casing 461 normally arranged in the machinery compartment 197, as previously explained.

Referring now to FIG. 10, the instruments 206 and 207 that are arranged in the instrument compartment 205 and readily accessible from the exterior of the container 50 may comprise any suitable meters or instruments. For example, the meter 206 may comprise a fuel gauge indicating the pressure of the liquified butane in the fuel storage tanks 481, and the meter 207 may comprise a continuous recording thermometer operative to produce a continuous temperature-time record of the temperature within the lading compartment 191. Of course, other instruments, not shown, may be provided in the instrument compartment 205, so as to assist the operator in supervising the operation and performance of the container 50, its refrigerating machine, and other auxilaries that may be operatively carried thereby.

In view of the above description, it will be appreciated that when the container 50 is adapted for highway operation, as shown in FIG. 1, access may be readily had to the interior of the lading compartment 191 through either one of the side doorways 190 in the opposite sides of the body 52 or through the rear doorway 310 through the rear of the body 52 for purposes of loading, unloading and inspection of the contained lading. On the other hand, when the container 50 is adapted for railway operation, as shown in FIG. 2, access to the interior of the lading compartment 191 is ordinarily limited to the side doorways 190 in the opposite sides of the body 52, due to end space limitations inherent to a string of coupled railway cars. However, even in this case, there is ample room between the ends of the two containers 50 for an operator to make inspection of the instruments in the instrument compartment 205 provided in the front end of the body 52. Also, in connection with the railway operation of the two containers 50 upon the railway car 70, it is mentioned that either end of either container 50 may be directed toward a given end of the railway car 70, thereby producing four different possible arrangements of the two containers 50 upon the railway car 70. Further, it will be appreciated that the railway car 70 protects each of the independently mounted containers 50 carried thereby against the transmission thereto of severe longitudinal shocks from the railway car 70, thereby protecting against damage the container 50, the refrigerating machinery carried by the container 50 and the lading arranged in the lading compartment 191 of the body 52 of the container 50.

In a constructional example of the container 50, the same may have a maximum width between the opposite sides of the end side members 340, as shown in FIG. 5, of 7'-9⅛", a maximum height between the bottom of the rear end bumper member 137 and the top of the end top member 320, as shown in FIG. 5, of 8'-6", and a length between the front of the front end bumper member 101 and the rear end of the rear end bumper member 137, as shown in FIG. 21, of 40'-0". The railway car 70 has a length between the striker plates carried by the opposite ends of the center sill 71 of 85'-8", and a height of the top of the center sill 71 above the tops of the track rails 74 of 3'-8½", as shown in FIG. 2. When the container 50 occupies its mounted position upon the railway car 70, employing the bolsters 81 and 82, as best shown in FIG. 3, the maximum clearance height between the tops of the track rails 74 and the top of the body 52 of the container 50 is 12'-8 3/16". The other dimensions of the container 50 are generally related to those set forth in accordance with the scales of the different figures of the drawings.

In the container 50, the floor panel 150 is of block-like configuration having a length (X) of 39'-7½", a width (Y) of 7'-4⅞" and a thickness (Z) of 4.8"; whereby the floor panel 150 has a length X that is in excess of about 30 feet and a width Y that is in excess of about 6 feet and a thickness Z that is in excess of about 4 inches. In the floor panel 150, each of the inner liner sheet 151 and the other weather sheet 157 is preferably formed of a suitable aluminum alloy, as previously noted, but the same may be formed of steel, including stainless steel; and ordinarily the gauge thereof is within the general range 20 to 100 mils, 0.025" aluminum sheet being entirely satisfactory, as previously noted. Of course, additional strength may be imparted to the floor panel 150 by increasing the thickness of each of the plywood sheets 152, 154 and 156; however, the use of ¼" fir plywood for this purpose is altogether adequate. Similarly, the "k" factor of the floor panel 150 may be further reduced by increasing the thickness of each of the slabs 153 and 155, but here again little advantage is gained since the floor panel 150 already has an exceedingly low "k" factor employing the foamed polystyrne slabs 153 and 155 each of a thickness of 2".

At this point, it is noted that the peculiar arrangement of the elements 152, 153, 154, 155 and 156 in the floor panel 150 is productive of a stiffness therein that greatly exceeds that obtained by the mere sandwich utilization of such materials of equivalent thicknesses. Specifically, a reference sandwich construction of 5-ply might comprise an outer weather sheet of aluminum of 0.025", an adjacent outer fir plywood sheet of ⅜", a foamed polystyrene core of 4", an adjacent inner fir plywood sheet of ⅜", and an inner liner sheet of aluminum of 0.025"; which reference sandwich of 5-ply has equivalent thicknesses of materials as the present sandwich of 7-ply, as disclosed heretofore; however, this reference sandwich of 5-ply is not nearly as stiff as the present sandwich of 7-ply. In other words, the present sandwich of 7-ply achieves a synergistic result with respect to stiffness in the present peculiar distribution of the same materials in the same total thicknesses; which increased stiffness is obtained without substantial increase in manufacturing costs of the floor panel 150 and with no particular increase in the weight thereof. Also, the present sandwich of 7-ply has a "k" factor that is somewhat lower than that of the reference panel of 5-ply, as described above. Hence, the present sandwich of 7-ply is productive of unique and unexpected characteristics with respect to those of the above described reference panel of 5-ply; and while the improved mode of the present sandwich of 7-ply is not altogether understood, it is none the less emphatic.

In the structure of the container 50, where materials of construction are not specifically designated, it will be understood that suitable materials of construction may be employed; however, steel is such suitable material of construction of a majority of the structural elements of the container 50, as herein disclosed.

In view of the foregoing, it is apparent that there has been provided a refrigerated freight container that is selectively adapted for highway operation and railway operation and that is of strong unitary construction and arrangement. The fundamentally strong and rigid structural member of the container that contributes so greatly to the overall strength and rigidity thereof, is the floor panel thereof, that is of the peculiar sandwich construction, as previously described; however, the roof panel and the side wall panels, as well as the front end wall panel and the bulkhead wall panel and the dividing wall panels, all of strong rigid sandwich construction, materially contribute to the total strength and rigidity of the container. Further, another feature of construction of the container that is of substantial importance with reference to the strength and rigidity thereof, concerns the arrangement wherein both the floor panel and the roof panel run from end to end thereof and beyond the lading compartment and respectively under and over both the machinery compartment and the fuel tank storage compartment and the plenum chamber formed in the front end of the body of the container, and notwithstanding the circumstance that the floor panel and the roof panel perform no particular useful heat-insulating functions with respect to these two compartments, but which arrangement is most advantageous to obtain maximum strength and rigidity in the container. Another important feature of construction of the container thus provided resides in the circumstance that the individual panels incorporated in the body thereof not only achieve great strength and rigidity in the body thereof, but are individually of exceedingly light weight and have an excellent heat-insulating characteristic; whereby a very low "U" factor is automatically achieved for the lading compartment defined in the body of the container by the assembly of the panels described, each having not only great strength and rigidity, but also an exceedingly low "k" factor.

While there has been described what is at present considered to be the preferred embodiment of the invention, it will be understood that various modifications may be made therein, and it is intended to cover in the appended claims all such modifications as fall within the true spirit and scope of the invention.

What is claimed is:

1. A demountable container adapted to be mounted upon railway running gear for use in railway operation and adapted to be mounted upon highway running gear for use in highway operation; said container comprising an elongated substantially rectangular composite base including a boundary frame provided with a pair of side sills and a pair of end sills and a floor panel of prefabricated unitary rigid sandwich structure arranged within said boundary frame, the opposite sides of said floor panel being respectively securely fastened to said side sills and the opposite ends of said floor panel being respectively securely fastened to said end sills, whereby said floor panel lends great rigidity to said composite base; said floor panel comprising an outer weather sheet of metal, a first sheet of plywood intimately adhered to the inner surface of said weather sheet, a first slab of synthetic organic resin of rigid cellular structure intimately adhered to the inner surface of said first plywood sheet, a second sheet of plywood intimately adhered to the inner surface of said first slab, a second slab of synthetic organic resin of rigid cellular structure intimately adhered to the inner surface of said second plywood sheet, a third sheet of plywood intimately adhered to the inner surface of said second slab, and an inner liner sheet of metal intimately adhered to the inner surface of said third plywood sheet, said second plywood sheet occupying a substantially central position between said first and second plywood sheets in said floor panel.

2. The demountable container set forth in claim 1, wherein said floor panel is of block-like configuration having a length (X) and a width (Y) and a thickness (Z), wherein X is in excess of about 30 feet and Y is in excess of about 6 feet and Z is in excess of about 4 inches.

3. The demountable container set forth in claim 1, wherein said outer weather sheet and said inner liner sheet each comprises a metal selected from the class consisting of steel and aluminum, and each of said slabs consists essentially of foamed polystyrene.

4. The demountable container set forth in claim 1, wherein each of said outer weather sheet and said inner liner sheet has a thickness of substantially T1, each of said plywood sheets has a thickness of substantially T2, and each of said slabs has a thickness of substantially T3, wherein $$T1 << T2 << T3$$

5. The demountable container set forth in claim 1, wherein each of said outer weather sheet and said inner liner sheet has a thickness of the order of 20 to 50 mils, each of said plywood sheets has a thickness of about ¼ inch, and each of said slabs has a thickness of about 2 inches.

6. A freight container comprising an elongated substantially rectangular base frame including a pair of longitudinally extending side sills and a pair of laterally extending end sills, the opposite ends of said side sills being rigidly secured to the corresponding opposite ends of said end sills, a laterally extending intermediate sill arranged within the front portion of said base frame and located rearwardly of the front one of said end sills, the opposite ends of said intermediate sill being rigidly secured to the adjacent front portions of said side sills, a lower front plate carried by the lower front portion of said base frame and extending longitudinally between said front end sill and said intermediate sill and laterally between the front portions of said side sills and rigidly secured thereto, an upper front plate carried by the upper front portion of said base frame and extending longitudinally between said front end sill and said intermediate sill and laterally between the front portions of said side sills and rigidly secured thereto, rim structure rigidly carried by said side sills and by said end sills and projecting upwardly above said upper front plate, an elongated substantially rectangular floor panel of prefabricated unitary rigid sandwich structure arranged within said rim structure with the lower front portion thereof engaging the top of said upper plate and supported by said base frame and securely fastened thereto, whereby said base frame and said floor panel cooperate to produce a composite base with said floor panel lending great rigidity thereto, wall structure carried by said composite base and disposed thereabove and cooperating therewith to produce a substantially box-like body defining a lading compartment therein, substantially box-like reinforcing structure arranged within the front portion of said base frame and between said lower front plate and said upper front plate, said box-like reinforcing structure being rigidly secured to the front portions of said side sills and located substantially along the longitudinal center line of said base frame, a removable block adapted to be selectively placed within and removed from said box-like reinforcing structure through a registering opening provided in said lower front plate, said block also being adapted to be securely fastened in place within said box-like reinforcing structure and carrying a depending kingpin projecting downwardly below said lower front plate and thus below the front portion of said base frame and located substantially along the longitudinal axis of said composite base, said lower front plate being adapted selectively to engage a cooperating fifth-wheel mechanism carried by the rear end of an associated road tractor so as to facilitate selective coupling and uncoupling of said kingpin by the fifth-wheel mechanism, thereby to accommodate the front end of said freight container to highway transportation as a road semi-trailer, and supporting structure provided by the rear portions of said side sills and adapted selectively to engage and to effect connection to an associated removable road bogie, thereby to accommodate the rear end of said freight container to highway transportation as a road semi-trailer.

7. A freight container comprising an elongated substantially rectangular base frame including a pair of longitudinally extending side sills and a pair of laterally extending end sills, the opposite ends of said side sills being rigidly secured to the corresponding opposite ends of said end sills, a first laterally extending intermediate sill arranged within the front portion of said base frame and located rearwardly of the front one of said end sills, the opposite ends of said first intermediate sill being rigidly secured to the adjacent front portions of said side sills, a lower front plate carried by the lower front portion of said base frame and extending longitudinally between said front end sill and said first intermediate sill and laterally between the front portions of said side sills and rigidly secured thereto, an upper front plate carried by the upper front portion of said base frame and extending longitudinally between said front end sill and said first intermediate sill and laterally between the front portions of said side sills and rigidly secured thereto, a second laterally extending intermediate sill arranged within the rear portion of said base frame and located forwardly of the rear one of said end sills, the opposite ends of said second intermediate sill being rigidly secured to the adjacent rear portions of said side sills, a lower rear plate carried by the lower rear portion of said base frame and extending longitudinally between said rear end sill and said second intermediate sill and laterally between the rear portions of said side sills and rigidly secured thereto, an upper rear plate carried by the upper rear portion of said base frame and extending longitudinally between said rear end sill and said second intermediate sill and laterally between the rear portions of said side sills and rigidly secured thereto, rim structure rigidly carried by said side sills and by said end sills and projecting upwardly above said upper front plate and said upper rear plate, an elongated substantially rectangular floor panel of prefabricated unitary rigid sandwich structure arranged within said rim structure with the lower front portion thereof engaging the top of said upper front plate and with the lower rear portion thereof engaging the top of said upper rear plate and supported by said base frame and securely fastened thereto, whereby said base frame and said floor panel cooperate to produce a composite base with said floor panel lending great rigidity thereto, wall structure carried by said composite base and disposed thereabove and cooperating therewith to produce a substantially box-like body defining a lading compartment therein, substantially box-like reinforcing structure arranged within the front portion of said base frame and between said lower front plate and said upper front plate, said box-like reinforcing structure being rigidly secured to the front portions of said side sills and located substantially along the longitudinal center line of said base frame, a removable block adapted to be selectively placed within and removed from said box-like reinforcing structure through a registering opening provided in said lower front plate, said block also being adapted to be securely fastened in place within said box-like reinforcing structure and carrying a depending kingpin projecting downwardly below said lower front plate and thus below the front portion of said base frame and located substantially along the longitudinal axis of said composite base, said lower front plate being adapted selectively to engage a cooperating fifth-wheel mechanism carried by the rear end of an associated road tractor so as to facilitate selective coupling and uncoupling of said kingpin by the fifth-wheel mechanism, thereby to accommodate the front end of said freight container to highway transportation as a road semi-trailer, and supporting structure provided by the rear portions of said side sills and adapted selectively to engage and to effect connection to an associated removable road bogie, thereby to accommodate the rear end of said freight container to highway transportation as a road semi-trailer.

8. The freight container set forth in claim 7, wherein said lower front plate has a pair of laterally spaced-apart front securing openings formed therein, said lower rear plate has a pair of laterally spaced-apart rear securing openings formed therein, and said two pairs of securing openings named being substantially symmetrically arranged with respect to the longitudinal and lateral axes of said composite base and adapted to receive two cooperating and coordinate pairs of upstanding securing projections carried by the frame of an associated railway car, thereby to accommodate said freight container to railway transportation as a railway car body.

9. A freight container comprising an elongated substantially rectangular base frame including a pair of longitudinally extending side sills and a pair of laterally extending end sills, the opposite ends of said side sills being rigidly secured to the corresponding opposite ends of said end sills, a first laterally extending intermediate sill arranged within the front portion of said base frame and located rearwardly of the front one of said end sills, the opposite ends of said first intermediate sill being rigidly secured to the adjacent front portions of said side sills, a lower front plate carried by the lower front portion of said base frame and extending longitudinally between said front end sill and said first intermediate sill and laterally between the front portions of said side sills and rigidly secured thereto, an upper front plate carried by the upper front portion of said base frame and extending longitudinally between said front end sill and said first intermediate sill and laterally between the front portions of said side sills and rigidly secured thereto, a second laterally extending intermediate sill arranged within the rear portion of said base frame and located forwardly of the rear one of said end sills, the opposite ends of said second intermediate sill being rigidly secured to the adjacent rear portions of said side sills, a lower rear plate carried by the lower rear portion of said base frame and extending longitudinally between said rear end sill and said second intermediate sill and laterally between the rear portions of said side sills and rigidly secured thereto, an upper rear plate carried by the upper rear portion of said base frame and extending longitudinally between said rear end sill and said second intermediate sill and laterally between the rear portions of said side sills and rigidly secured thereto, rim structure rigidly carried by said side sills and by said end sills and projecting upwardly above said upper front plate and said upper rear plate, an elongated substantially rectangular floor panel of prefabricated unitary rigid sandwich structure arranged within said rim structure with the lower front portion thereof engaging the top of said upper front plate and with the lower rear portion thereof engaging the top of said upper rear plate and supported by said base frame and securely fastened thereto, whereby said base frame and said floor panel cooperate to product a composite base with said panel lending great rigidity thereto, wall structure carried by said composite base and disposed thereabove and cooperating therewith to produce a substantially box-like body defining a lading compartment therein, said lower front plate having a pair of laterally spaced-apart front securing openings therein, said lower rear plate having a pair of laterally spaced-apart rear securing openings formed therein, said two pairs of securing openings named being substantially symmetrically arranged with respect to the longitudinal and lateral axes of said composite base and adapted to receive two cooperating and coordinate pairs of upstanding securing projections carried by the frame of an associated railway car, thereby to accommodate said freight container to railway transportation as a railway car body.

10. The freight container set forth in claim 9, and further comprising a pair of hollow front securing structures arranged within the front portion of said base frame and rigidly secured thereto and respectively located in alignment with said pair of front securing openings and adapted to cooperate with the associated pair of securing projections projected thereinto through said pair of front securing openings to effect securing actions therebetween, and a pair of hollow rear securing structures arranged within the rear portion of said base frame and rigidly secured thereto and respectively located in alignment with said pair of rear securing openings and adapted to cooperate with the associated pair of securing projections projected thereinto through said pair of rear securing openings to effect securing actions therebetween.

11. A freight container comprising an elongated substantially rectangular base frame including a pair of longitudinally extending side sills and a pair of laterally extending end sills, the opposite ends of said side sills being rigidly secured to the corresponding opposite ends of said end sills, a first laterally extending intermediate sill arranged within the front portion of said base frame and located rearwardly of the front one of said end sills, the opposite ends of said first intermediate sill being rigidly secured to the adjacent front portions of said side sills, a front plate carried by the front portion of said base frame and extending longitudinally between said front end sill and said first intermediate sill and laterally between the front portions of said side sills and rigidly secured thereto, a second laterally extending intermediate sill arranged within the rear portion of said base frame and located forwardly of the rear one of said end sills, the opposite ends of said second intermediate sill being rigidly secured to the adjacent rear portions of said side sills, a rear plate carried by the rear portion of said base frame and extending longitudinally between said rear end sill and said second intermediate sill and laterally between the rear portions of said side sills and rigidly secured thereto, rim structure rigidly carried by said side sills and by said end sills and projecting upwardly above said front and rear plates, an elongated substantially rectangular floor panel of prefabricated unitary rigid sandwich structure arranged within said rim structure with the lower front portion thereof engaging the top of said front plate and with the lower rear portion thereof engaging the top of said rear plate and supported by said base frame and securely fastened thereto, whereby said base frame and said floor panel cooperate to produce a composite base with said floor panel lending great rigidity thereto, and wall structure carried by said composite base and disposed thereabove and cooperating therewith to produce a substantially box-like body defining a lading compartment therein.

12. The freight container set forth in claim 11, wherein said floor panel comprises an outer weather sheet of metal, a first sheet of plywood intimately adhered to the inner surface of said weather sheet, a first slab of synthetic organic resin of rigid cellular structure intimately adhered to the inner surface of said first plywood sheet, a second sheet of plywood intimately adhered to the inner surface of said first slab, a second slab of synthetic organic resin of rigid cellular structure intimately adhered to the inner surface of said second plywood sheet, a third sheet of plywood intimately adhered to the inner surface of said second slab, and an inner liner sheet of metal intimately adhered to the inner surface of said third plywood sheet.

13. In a freight container, an elongated substantially rectangular base frame including a pair of longitudinally extending side sills and a pair of laterally extending end sills, the opposite ends of said side sills being rigidly secured to the corresponding opposite ends of said end sills, each of said side sills including an upstanding web and a reinforcing flange carried by the bottom of said web and an inwardly projecting ledge carried by the intermediate inner portion of said web and located above said flange and an outwardly and downwardly directed bumper element carried by the intermediate outer portion of said web and located above said flange, a pair of longitudinally extending side members respectively carried by said side sills, each of said side members being substantially L-shaped including an upstanding flange and an inwardly projecting flange, the upstanding flange of each of said side members being secured to the upper inner portion of the upstanding web of the associated one of said side sills, the inwardly projecting flange of each of said side members being secured to the top of the inwardly projecting ledge of the associated one of said side sills, an elongated substantially rectangular floor panel of prefabricated unitary rigid sandwich structure arranged within said base frame with the opposite lower side portions thereof directly respectively supported upon the tops of the inwardly projecting flanges of said side members, and means for rigidly securing the opposite side edges of said floor panel to the respective upstanding flanges of said side members, whereby said base frame and said floor panel cooperate to produce a composite base with said floor panel lending great rigidity thereto.

14. The freight container combination set forth in claim 13, wherein each of said side sills comprises an integral metal extrusion.

15. A refrigerated container comprising an elongated substantially rectangular composite base including a boundary frame provided with a pair of longitudinally extending side sills and a pair of laterally extending end sills and an elongated substantially rectangular floor panel of prefabricated unitary rigid heat-insulating sandwich structure arranged within said boundary frame, the opposite sides of said floor panel being respectively securely fastened to said side sills and the opposite ends of said floor panel being respectively securely fastened to said end sills, whereby said floor panel lends great rigidity to said composite base, an elongated substantially rectangular roof panel of prefabricated unitary rigid heat-insulating sandwich structure positioned above said floor panel, an upstanding laterally extending substantially rectangular bulkhead panel of prefabricated unitary rigid heat-insulating sandwich structure positioned between said floor panel and said roof panel and located rearwardly of the front ends of said floor panel and said roof panel, the bottom and the top of said bulkhead panel being respectively securely fastened to the adjacent portions of said floor panel and said roof panel, first upstanding heat-insulating wall structure positioned between said floor panel and said roof panel and located rearwardly of said bulkhead panel and cooperating mutually therewith to produce a substantially box-like heat-insulating body defining a lading compartment therein that is disposed in the central portion and in the rear end of said container, second upstanding heat-insulating wall structure positioned between said floor panel and said roof panel and located forwardly of said bulkhead panel and cooperating mutually therewith to define a plenum chamber therein that is disposed in the front end of said container, said bulkhead panel having holes therein to accommodate the circulation of air between said lading compartment and said plenum chamber, and other wall structure cooperating mutually with said floor panel and said roof panel and said bulkhead panel and said second wall structure to define a machinery compartment therein that is located exteriorly of said lading compartment and said plenum chamber and that is also disposed in the front end of said container, said machinery compartment being adapted to receive a removable refrigerating machine provided with an evaporator, said second wall structure having an opening therein that is adapted to accommodate the passage therethough of the evaporator of the refrigerating machine, so that when the refrigerating machine occupies its normal position in said machinery compartment the evaporator thereof is located in said plenum chamber.

16. The refrigerated container set forth in claim 15, wherein said first wall structure cooperates with said floor panel and said roof panel to produce said body and defining said lading compartment therein and provided with a rear doorway communicating with the rear end of said lading compartment, and further comprising a pair of heat-insulating rear doors respectively mounted upon the opposite rear sides of said body for pivoted movements relative thereto and with respect to said rear doorway, said rear doors being movable inwardly into closed positions disposed within said rear doorway and movable outwardly into open positions removed from said rear doorway, and a pair of upstanding flue sheets respectively carried by the inner portions of said rear doors and respectively defining a pair of upstanding flue passages communicating between the bottom rear end and the top rear end of said lading compartment with said rear doors in their closed positions, thereby further to accommodate the circulation of air through said lading chamber and between said lading chamber and said plenum chamber.

17. The refrigerated container set forth in claim 15, wherein said first wall structure essentially comprises a pair of upstanding longitudinally extending substantially rectangular side wall panels each of prefabricated unitary rigid heat-insulating sandwich structure positioned between said floor panel and said roof panel and respectively located adjacent to the opposite sides thereof, the bottom of each of said side wall panels being securely fastened to the adjacent side portion of said floor panel and to the adjacent one of said side sills and the top of each of said side wall panels being securely fastened to the adjacent side portion of said roof panel, whereby said body is produced by said prefabricated panels named and defining said lading compartment therein and provided with a rear doorway, and heat-insulating rear door structure carried by the rear end of said body and selectively movable between open and closed positions with respect to said rear doorway.

18. The refrigerated container set forth in claim 15, wherein said first wall structure essentially comprises a pair of upstanding longitudinally extending substantially rectangular front side wall panels each of prefabricated unitary rigid heat-insulating sandwich structure positioned between said floor panel and said roof panel and respectively located adjacent to the opposite sides thereof, the bottom of each of said front side wall panels being securely fastened to the adjacent side portion of said floor panel and to the adjacent one of said side sills and the top of each of said front side wall panels being securely fastened to the adjacent side portion of said roof panel, a pair of upstanding longitudinally extending substantially rectangular rear side wall panels each of prefabricated unitary rigid heat-insulating sandwich structure positioned between said floor panel and said roof panel and respectively located adjacent to the oppositse sides thereof, the bottom of each of said rear side wall panels being securely fastened to the adjacent side portion of said floor panel and to the adjacent one of said side sills and the top of each of said rear side wall panels being securely fastened to the adjacent side portion of said roof panel, each one of said front side wall panels being disposed in longitudinal alignment and spaced-apart relation with the associated one of said rear side wall panels, whereby said body is produced by said prefabricated panels named and defining said lading compartment therein and provided with a pair of side doorways and a rear doorway, a pair of heat-insulating side door structures respectively carried by the opposite sides of said body and selectively movable between open and closed positions with respect to the associated ones of said side doorways, and heat-insulating rear door structure carried by the rear end of said body and selectively movable between open and closed positions with respect to said rear doorway.

19. A refrigerated container comprising an elongated substantially rectangular composite base including a boundary frame provided with a pair of longitudinally extending side sills and a pair of laterally extending end sills and an elongated substantially rectangular floor panel of prefabricated unitary rigid heat-insulating sandwich structure arranged within said boundary frame, the opposite sides of said floor panel being respectively securely fastened to said side sills and the opposite ends of said floor panel being respectively securely fastened to said end sills, whereby said floor panel lends great rigidity to said composite base, an elongated substantially rectangular roof panel of prefabricated unitary rigid heat-insulating sandwich structure positioned above said floor panel, an upstanding laterally extending substantially rectangular bulkhead panel of prefabricated unitary rigid heat-insulating sandwich structure positioned between said floor panel and said roof panel and located rearwardly of the front ends of said floor panel and said roof panel, the bottom and the top of said bulkhead panel being respectively securely fastened to the adjacent portions of said floor panel and said roof panel, first upstanding heat-insulating wall structure positioned between said floor panel and said roof panel and located rearwardly of said bulkhead panel and cooperating mutually therewith to produce a substantially box-like heat-insulating body defining a lading compartment therein that is disposed in the central portion and in the rear end of said container, second upstanding heat-insulating wall structure positioned between said floor panel and said roof panel and located forwardly of said bulkhead panel and cooperating mutually therewith to define a plenum chamber therein that is disposed in the front end of said container, said bulkhead panel having holes therein to accommodate the circulation of air between said lading compartment and said plenum chamber, and other wall structure cooperating mutually with said floor panel and said roof panel and said bulkhead panel and said second wall structure to define a machinery compartment therein that is located exteriorly of said lading compartment and said plenum chamber and that is also disposed in the front end of said container, said machinery compartment being adapted to receive a removable unit including an internal combustion engine and a refrigerating machine provided with a compressor driven by the internal combustion engine and a condenser connected to the compressor and an evaporator connected between the condenser and the compressor, said second wall structure having an opening therein that is adapted to accommodate the passage therethrough of the evaporator of the refrigerating machine, so that when the unit occupies its normal position in said machinery compartment the evaporator of the refrigerating machine is located in said plenum chamber, said roof panel having a flue formed therethrough and disposed directly above said machinery compartment, so as to accommodate the passage through said flue to the exterior of exhaust combustion gases from the internal combustion engine and heat-exchange air after circulation over the condenser of the refrigerating machine when the unit occupies its normal position in said machinery compartment, and baffle structure arranged in said flue in order to prevent rain and the other elements of weather from falling through said flue directly into the unit when it occupies its normal position in said machinery compartment.

20. A refrigerated container comprising an elongated substantially rectangular composite base including a boundary frame provided with a pair of longitudinally extending side sills and a pair of laterally extending end sills and an elongated substantially rectangular floor panel of prefabricated unitary rigid heat-insulating sandwich structure arranged within said boundary frame, the opposite sides of said floor panel being respectively securely fastened to said side sills and the opposite ends of said floor panel being respectively securely fastened to said end sills, whereby said floor panel lends great rigidity to said composite base, an elongated substantially rectangular roof panel of prefabricated unitary rigid heat-insulating sandwich structure positioned above said floor panel, an upstanding laterally extending substantially rectangular bulkhead panel of prefabricated unitary rigid heat-insulating sandwich structure positioned between said floor panel and said roof panel and located rearwardly of the front ends of said floor panel and said roof panel, the bottom and the top of said bulkhead panel being respectively securely fastened to the adjacent portions of said floor panel and said roof panel, first upstanding heat-insulating wall structure positioned between said floor panel and said roof panel and located rearwardly of said bulkhead panel and cooperating mutually therewith to produce a substantially box-like heat-insulating body defining a lading compartment therein that is disposed in the central portion and in the rear end of said container, second upstanding heat-insulating wall structure positioned between said floor panel and said roof panel and located forwardly of said bulkhead panel and substantially centrally of the front end of said container and cooperating mutually with said three panels named to define a plenum chamber therein that is disposed substantially centrally in the front end of said container, said bulkhead panel having holes therein to accommodate the circulation of air between said lading compartment and said plenum chamber, other wall structure cooperating mutually with said floor panel and said roof panel and said bulkhead panel and said second wall structure to define a machinery compartment therein that is located exteriorly of said lading compartment and said plenum chamber and that is disposed in one corner in the front end of said container, said machinery compartment being adapted to receive a removable unit including an internal combustion engine and a refrigerating machine provided with a compressor driven by the internal combustion engine and a condenser connected to the compressor and an evaporator connected between the condenser and the compressor, said second wall structure having an opening therein that is adapted to accommodate the passage therethrough of the evaporator of the refrigerating machine, so that when the unit occupies its normal position in said machinery compartment the evaporator of the refrigerating machine is located in said plenum chamber, and further wall structure cooperating mutually with said floor panel and said roof panel and said bulkhead panel and said second wall structure to define a fuel tank storage compartment therein that is located exteriorly of said lading compartment and said plenum chamber and that is disposed in the other corner in the front end of said container, said fuel tank storage compartment being adapted to receive a removable fuel tank containing fuel for the internal combustion engine of the unit when it occupies its normal position in said machinery compartment.

References Cited in the file of this patent
UNITED STATES PATENTS

| | | |
|---|---|---|
| 1,918,335 | Heylandt | July 18, 1933 |
| 2,325,371 | Clerc | July 27, 1943 |
| 2,968,933 | Pfeifer | Jan. 24, 1961 |
| 3,003,810 | Kloote | Oct. 10, 1961 |
| 3,029,968 | Saunders | Apr. 17, 1962 |